United States Patent
Sato

(10) Patent No.: US 10,445,901 B2
(45) Date of Patent: Oct. 15, 2019

(54) IMAGE DISPLAYING METHOD INCLUDING IMAGE ENCODING METHOD AND IMAGE DECODING METHOD

(71) Applicant: Samsung Display Co., LTD., Yongin-si, Gyeonggi-Do (KR)

(72) Inventor: Kazushi Sato, Hwaseong-si (KR)

(73) Assignee: Samsung Display Co., Ltd. (KR)

(*) Notice: Subject to any disclaimer, the term of this patent is extended or adjusted under 35 U.S.C. 154(b) by 210 days.

(21) Appl. No.: 15/608,879

(22) Filed: May 30, 2017

(65) Prior Publication Data

US 2017/0345187 A1  Nov. 30, 2017

(30) Foreign Application Priority Data

May 31, 2016  (KR) .................. 10-2016-0067594

(51) Int. Cl.
*G06T 9/00* (2006.01)
*G09G 3/34* (2006.01)
(Continued)

(52) U.S. Cl.
CPC .......... *G06T 9/004* (2013.01); *G09G 3/3413* (2013.01); *H04N 5/2352* (2013.01); *H04N 5/57* (2013.01);
(Continued)

(58) Field of Classification Search
CPC .... G06T 9/004; H04N 19/105; H04N 19/124; H04N 19/186; H04N 5/2352; H04N 5/57; G09G 3/3413
See application file for complete search history.

(56) References Cited

U.S. PATENT DOCUMENTS

| | | | |
|---|---|---|---|
| 9,008,180 B2* | 4/2015 | Jeong | H04N 19/44 375/240.13 |
| 2006/0197777 A1* | 9/2006 | Cha | H04N 19/34 345/600 |

(Continued)

FOREIGN PATENT DOCUMENTS

| | | |
|---|---|---|
| KR | 10-0160610 B1 | 1/1999 |
| KR | 10-0166723 B1 | 3/1999 |

(Continued)

OTHER PUBLICATIONS

Walls et al., "VESA Display Stream Compression", VESA, Mar. 3, 2014, 5 pages.

(Continued)

*Primary Examiner* — Wesley J Tucker
(74) *Attorney, Agent, or Firm* — Innovation Counsel LLP

(57) ABSTRACT

All image-displaying method includes deriving a luminance prediction value, calculating a luminance residual, deriving a chrominance prediction value, calculating a first chrominance residual, deriving a quantized luminance value by quantizing the luminance residual, deriving an inverse quantized luminance value by inverse quantizing the quantized luminance value, selecting one of candidate coefficients as a modification factor, calculating a second chrominance residual by subtracting an adjustment value from the first chrominance residual (wherein the adjustment value is equal to the inverse quantized luminance value multiplied by the modification factor), deriving a quantized chrominance value by quantizing the second chrominance residual, encoding the quantized luminance value and the quantized chrominance value to produce encoded data, decoding the encoded data to obtain decoded image data, and controlling a display device according to the decoded image data to display an image.

20 Claims, 20 Drawing Sheets

(51) Int. Cl.
*H04N 5/235* (2006.01)
*H04N 5/57* (2006.01)
*H04N 19/105* (2014.01)
*H04N 19/124* (2014.01)
*H04N 19/186* (2014.01)

(52) U.S. Cl.
CPC ......... *H04N 19/105* (2014.11); *H04N 19/124* (2014.11); *H04N 19/186* (2014.11)

(56) References Cited

U.S. PATENT DOCUMENTS

| | | | | |
|---|---|---|---|---|
| 2009/0067495 | A1* | 3/2009 | Au | H04N 19/176 |
| | | | | 375/240.12 |
| 2012/0128068 | A1* | 5/2012 | Thoreau | H04N 19/105 |
| | | | | 375/240.12 |
| 2014/0056366 | A1* | 2/2014 | Rosewarne | H04N 5/00 |
| | | | | 375/240.26 |
| 2015/0117519 | A1* | 4/2015 | Kim | H04N 19/136 |
| | | | | 375/240.02 |
| 2015/0264411 | A1 | 9/2015 | Rosengren et al. | |
| 2015/0289010 | A1 | 10/2015 | Kharitonsky et al. | |
| 2015/0334395 | A1 | 11/2015 | Schwartz et al. | |
| 2016/0014437 | A1 | 1/2016 | Perlman et al. | |
| 2016/0165244 | A1* | 6/2016 | Bordes | H04N 19/50 |
| | | | | 382/233 |
| 2017/0134732 | A1* | 5/2017 | Chen | H04N 19/70 |
| 2018/0184127 | A1* | 6/2018 | Zhang | H04N 19/82 |

FOREIGN PATENT DOCUMENTS

| | | |
|---|---|---|
| KR | 10-2009-0008415 A | 1/2009 |
| KR | 10-2011-0074957 A | 7/2011 |
| KR | 10-2012-0012385 A | 2/2012 |
| KR | 10-2013-0059288 A | 6/2013 |
| KR | 10-2015-0079989 A | 7/2015 |
| WO | 2015066525 | 5/2015 |

OTHER PUBLICATIONS

Martucci, "Reversible Compression of HDTV Images Using Median Adaptive Prediction and Arithmetic Coding" IEEE Int Sym on Circuit and Systems, vol. 2, 1990, 4 pages.
Malvar et al., "Lifting-based reversible color transformations for image compression." SPIE vol. 7073, 2008, 10 pages.
EP Search Report corresponding to European Patent Application No. 17173798.4, dated Oct. 4, 2017, 22 pages.

* cited by examiner

IMAGE DISPLAYING METHOD INCLUDING IMAGE ENCODING METHOD AND IMAGE DECODING METHOD

CROSS REFERENCE TO RELATED APPLICATION

This application claims priority under 35 U.S.C. § 119 to Korean patent application No. 10-2016-0067594 filed on May 31, 2016; the disclosure of the Korean patent application is incorporated by reference herein in its entirety.

BACKGROUND

1. Technical Field

The technical field is related to image processing methods.

2. Description of the Related Art

The order to display high-resolution or high-definition image, a source device transmits high-resolution or high-definition image data to a display device (or target device) through a display link, such as a display port. Since the bandwidth of the display link is limited, there is a need to efficiently compress the high-resolution or high-definition image data and transmit the compressed image data through the display link. Various image encoding methods are used for encoding high-resolution or high-definition image data. However, with existing image encoding methods, image quality can decrease, or efficiency of image encoding/decoding can decrease for pixels having a relatively large residual or positioned at a boundary of a pixel group.

SUMMARY

Example embodiments are related to an image encoding method for optimizing image quality.

Example embodiments are related to an image decoding method for optimizing image quality.

According to some example embodiments, ail image encoding method may include an operation of deriving a luminance prediction value based on a luminance value of a previous image data, an operation of calculating a luminance residual by subtracting the luminance prediction value from a luminance value of a current image data, an operation of deriving a chrominance prediction value based on a chrominance value of the previous image data, an operation of calculating a first chrominance residual by subtracting the chrominance prediction value from a chrominance value of the current image data, an operation of deriving a quantized luminance value by quantizing the luminance residual, an operation of deriving an inverse quantized luminance value by inverse quantizing fee quantized luminance value, an operation of selecting one of candidate coefficients as a modification factor, an operation of calculating a second chrominance residual by subtracting a value by multiplying the inverse quantized luminance value by the modification factor from the first chrominance residual, an operation of deriving a quantized chrominance value by quantizing the second chrominance residual, and an operation of encoding the quantized luminance value and the quantized chrominance value to output a bitstream.

In example embodiments, the candidate coefficients may be between −1 and 1, and correspond to $m/2^n$, where n and m are integers. The modification factor may be determined among the candidate coefficients such that a difference value between the first chrominance residual and a value by multiplying the inverse quantized luminance value by the modification factor is minimized.

In example embodiments, each of the previous image data and the current image data may be divided into a plurality of slices to being encoded. The encoding the quantized luminance value and the quantized chrominance value may include an operation of converting the quantized luminance value and the quantized chrominance value for each of slices into encoded data, an operation of calculating a compression difficulty for each of the slices based on an average quantized value of the previous image data for each of the slices, an operation of calculating a compression difficulty ratio of the compression difficulty to an average compression difficulty of the slices, and an operation of adjusting a bit rate for each of the slices based on the compression difficulty ratio.

In example embodiments, the compression difficulty ratio may be converted to a value corresponding to $m/2^n$, where n and m are integers.

In example embodiments, the deriving the luminance prediction value may include an operation of selecting one of candidate vector values as a first vector value such that a similarity index between a luminance value corresponding to the first vector value and a luminance value corresponding to a reference position is minimized, an operation of selecting one of the first vector value and adjacent vector values adjacent to the first vector value as a second vector value such that a similarity index between a luminance value corresponding to the second vector value and the luminance value corresponding to the reference position is minimized, and an operation of calculating the luminance prediction value based on the luminance value corresponding to the second vector value.

In example embodiments, an interval between the candidate vector values may be M, where M is an integer greater than 1.

In example embodiments, an interval between the candidate vector values may increase as a distance between the reference position and the candidate vector values increases.

The example embodiments, the similarity index may be calculated by sum of absolute differences (SAD) between a pixel value of pixels that are included in a pixel group or adjacent to the pixel group and a pixel value of pixels located in the reference position.

In example embodiments, the deriving the luminance prediction value may include an operation of calculating median values of luminance values of pixels that are adjacent to each other, an operation of selecting one of candidate vector values corresponding the median values as a first vector value such that a similarity index between a median value of the first vector value and a luminance value corresponding to a reference position is minimized, the candidate vector values of which interval is M, where M is an integer greater than 1, an operation of selecting one of the first vector value and adjacent vector values adjacent to the first vector value as a second vector value such that a similarity index between a luminance value corresponding to the second vector value and the luminance value corresponding to the reference position is minimized, and an operation of calculating the luminance prediction value based on a luminance value corresponding to the second vector value.

In example embodiments, the luminance prediction value and the chrominance prediction value of a first pixel adjacent to a boundary of a pixel group may be respectively adjusted based on the luminance prediction value and the chrominance prediction value of a second pixel adjacent to the first pixel and outside of the pixel group.

In example embodiments, the deriving the quantized chrominance value may include an operation of selecting one of candidate quantization tables as a quantization table based on a difference value between an absolute average of the luminance residual and an absolute average of the chrominance residual, an operation of deriving a chrominance quantization parameter from the quantization table, and an operation of quantizing the second chrominance residual based on the chrominance quantization parameter.

In example embodiments, the deriving the quantized luminance value may include an operation of deriving a luminance quantization parameter from a quantization table, an operation of subtracting an offset value from the luminance quantization parameter when a pixel is adjacent to a boundary of a pixel group, and an operation of quantizing the luminance residual for the pixel based on the subtracted luminance quantization parameter.

The example embodiments, the offset value may increase as the luminance quantization parameter increases.

According to some example embodiments, an image encoding method may include an operation of deriving a luminance prediction value based on a luminance value of a previous image data, an operation of calculating a luminance residual by subtracting the luminance prediction value from a luminance value of a current image data, an operation of deriving a chrominance prediction value based on a chrominance value of the previous image data, an operation of calculating a chrominance residual by subtracting the chrominance prediction value from a chrominance value of the current image data, an operation of deriving a quantization parameter from a quantization table, an operation of subtracting an offset value from the quantization parameter when a pixel is adjacent to a boundary of a pixel group, an operation of quantizing the luminance residual and the chrominance residual for the pixel based on the subtracted quantization parameter to derive a quantized luminance value and a quantized chrominance value, and an operation of encoding the quantized luminance value and the quantized chrominance value.

The example embodiments, the offset value may increase as the quantization parameter increases.

The example embodiments, the quantization table may be determined among a plurality of candidate quantization tables based on a difference value between an absolute average of the luminance residual and an absolute average of the chrominance residual.

According to some example embodiments, an image encoding method may include an operation of selecting one of candidate vector values of which interval is M as a first vector value such that a similarity index between a pixel value corresponding to the first vector value and a pixel value corresponding to a reference position is minimized, where M is an integer greater than 1, an operation of selecting one of the first vector value and adjacent vector values adjacent to the first vector value as a second vector value such that a similarity index between a pixel value corresponding to the second vector value and the pixel value corresponding to the reference position is minimized, an operation of calculating a luminance prediction value and a chrominance prediction value based on a pixel value corresponding to the second vector value, an operation of calculating a luminance residual by subtracting the luminance prediction value from a luminance value of a current image data, an operation of calculating a chrominance residual by subtracting the chrominance prediction value from a chrominance value of a current image data, an operation of quantizing the luminance residual and the chrominance residual to derive a quantized luminance value and a quantized chrominance value, and an operation of encoding the quantized luminance value and the quantized chrominance value.

The example embodiments, the similarity index may be calculated by sum of absolute differences (SAD) between a pixel value of pixels that are included in a pixel group or adjacent to the pixel group and a pixel value of pixels located in the reference position.

In example embodiments, the luminance prediction value and the chrominance prediction value of a first pixel adjacent to a boundary of a pixel group may be respectively adjusted based on the luminance prediction value and the chrominance prediction value of a second pixel adjacent to the first pixel and outside of the pixel group.

According to some example embodiments, an image decoding method may include an operation of deriving a quantized luminance value and a quantized chrominance value by decoding a bitstream, an operation of deriving an inverse quantized luminance value by inverse quantizing the quantized luminance value, an operation of deriving a luminance prediction value based on a luminance value of a previous image data, an operation of generating a decoded luminance value by adding the inverse quantized luminance value and the luminance prediction value, an operation of deriving an inverse quantized chrominance value by inverse quantizing the quantized chrominance value, an operation of deriving a chrominance prediction value based on a chrominance value of the previous image data, an operation of generating a fast decoded, chrominance value by adding the inverse quantized chrominance value and the chrominance prediction value, an operation of selecting one of candidate coefficients as a modification factor, and an operation of generating a second decoded chrominance value by adding the first decoded chrominance value and a value by multiplying the inverse quantized luminance value by the modification factor.

An embodiment may be related to a method for displaying an image. The method may include the following steps: deriving a luminance prediction value based on a luminance value of previous image data; calculating a luminance residual by subtracting the luminance prediction value from a luminance value of current image data; deriving a chrominance prediction value based on a chrominance value of the previous image data; calculating a first chrominance residual by subtracting the chrominance prediction value from a chrominance value of the current image data; deriving a quantized luminance value by quantizing the luminance residual; deriving an inverse quantized luminance value by inverse quantizing the quantized luminance value; selecting one of candidate coefficients as a modification factor; calculating a second chrominance residual by subtracting an adjustment value from the first chrominance residual, wherein the adjustment value may be equal to the inverse quantized luminance value multiplied by the modification factor; deriving a quantized chrominance value by quantizing the second chrominance residual; encoding the quantized luminance value and the quantized chrominance value to produce encoded data; decoding the encoded data to obtain decoded image data, wherein the decoded image data may include decoded luminance data and decoded chrominance data; and controlling a display device according to the decoded image data to display the image.

The candidate coefficients may be greater than or equal to −1, less than or equal to 1, and equal to $m/2^n$, where n and m represent integers. The modification factor may be determined among the candidate coefficients such that a difference between the first chrominance residual and the adjustment value is minimized.

The method may include the following steps: dividing the previous image data into previous sub-image data sets that correspond to sub-image of the image; dividing the current image data into current sub-image data sets that correspond to the sub-image of the image; determining sub-image quantized luminance values and sub-image quantized chrominance values using the previous sub-image data sets and the current sub-image data sets; calculating compression difficulty values for the sub-images of the image based on an average quantized value of the previous sub-image data sets; calculating compression difficulty ratios using the compression difficulty value and an average of the compression difficulty values; and adjusting bit rates for the sub-images of the image based on the compression difficulty ratios.

The compression difficulty ratios may be converted to $m/2^n$, where n and m represent integers.

The deriving the luminance prediction value may include the following steps: selecting one of candidate vector values as a first vector value such that a first similarity index between a luminance value corresponding to the first vector value and a luminance value corresponding to a reference position is minimized; selecting one of the first vector value and adjacent vector values adjacent to the first vector value as a second vector value such that a second similarity index between a luminance value corresponding to the second vector value and the luminance value corresponding to the reference position is minimized; and calculating the luminance prediction value based on the luminance value corresponding to the second vector value.

Intervals between immediately neighboring vector values of the candidate vector values may be integers greater than 1.

Intervals between immediately neighboring vector values of the candidate vector values may increase as distances between the reference position and the candidate vector values increase.

At least one of the first similarity index and the second similarity index may be calculated using a sum of absolute differences between one or more pixel values of pixels that may be included in a pixel group or adjacent to the pixel group and one or more pixel values of pixels located in the reference position.

The deriving the luminance prediction value may include the following steps: calculating median values of luminance values of pixels that are adjacent to each other; selecting one of candidate vector values corresponding the median values as a first vector value such that a similarity index between a median value of the first vector value and a luminance value corresponding to a reference position is minimized, intervals between immediately neighboring vector values of the candidate vector values may be integers greater than 1: selecting one of the first vector value and adjacent vector values adjacent to the first vector value as a second vector value such that a similarity index between a luminance value corresponding to the second vector value and the luminance value corresponding to the reference position is minimized; and calculating the luminance prediction value based on the luminance value corresponding to the second vector value.

A first luminance prediction value and a first chrominance prediction value associated with a first pixel located at a boundary of a pixel group may be adjusted based on a second luminance prediction value and a second chrominance prediction value associated with a second pixel adjacent to the first pixel and outside the pixel group.

The deriving the quantized chrominance value may include the following steps: selecting one of candidate quantization tables as a quantization table based on a difference value between an absolute average of luminance residuals and an absolute average of chrominance residuals; deriving a chrominance quantization parameter from the quantization table; and quantizing the second chrominance residual based on the chrominance quantization parameter.

The deriving the quantized, luminance value may include the following steps: deriving a luminance quantization parameter from a quantization table; subtracting an offset value from the luminance quantization parameter to produce an adjusted luminance quantization parameter when a pixel may be located at a boundary of a pixel group; and quantizing a first luminance residual for the pixel based on the adjusted luminance quantization parameter.

The offset value may increase as the luminance quantization parameter increases.

An embodiment may be related to a method for displaying an image. The method may include the following steps: deriving a luminance prediction value for a first pixel based on a luminance value of previous image data. The first pixel may be located at a boundary of a pixel group; calculating a luminance residual for the first pixel by subtracting the luminance prediction value from a luminance value of current image data; deriving a chrominance prediction value for the first pixel based on a chrominance value of the previous image data; calculating a chrominance residual for the first pixel by subtracting the chrominance prediction value from a chrominance value of the current image data; deriving a quantization parameter from a quantization table; subtracting an offset value from the quantization parameter to produce an adjusted quantization parameter; quantizing the luminance residual and the chrominance residual for the pixel based on the adjusted quantization parameter to derive a quantized luminance value and a quantized chrominance value; encoding the quantized luminance value and the quantized chrominance value to produce encoded data; decoding the encoded data to obtain decoded image data; and controlling a display device according to the decoded image data to display the image.

The offset value may increase as the quantization parameter increases.

The quantization table may be determined among a plurality of candidate quantization tables based on a difference value between an absolute average of luminance residuals and an absolute average of chrominance residuals.

An embodiment may be related to a method for displaying an image. The method may include the following steps: selecting one of candidate vector values as a first vector value such that a first similarity index between a pixel value corresponding to the first vector value and a pixel value corresponding to a reference position is minimized, wherein intervals between immediately neighboring vector values of the candidate vector values may be integers greater than 1; selecting one of the first vector value and adjacent vector values adjacent to the first vector value as a second vector value such that a second similarity index between a pixel value corresponding to the second vector value and the pixel value corresponding to the reference position is minimized; calculating a luminance prediction value and a chrominance prediction value based on the pixel value corresponding to the second vector value; calculating a luminance residual by subtracting the luminance prediction value from a luminance value of current image data; calculating a chrominance residual by subtracting the chrominance prediction value from a chrominance value of the current image data; quantizing the luminance residual and the chrominance residual to derive a quantized luminance value and a quantized chrominance value; encoding the quantized luminance value and the quantized chrominance value to produce encoded data; decoding the encoded data to obtain decoded image data; and controlling a display device according to the decoded image data to display the image.

At least one of the first similarity index and the second similarity index may be calculated using a sum of absolute differences between one or more pixel values of pixels that may be included in a pixel group or adjacent to the pixel group and one or more pixel values of pixels located in the reference position.

A first luminance prediction value and a first chrominance prediction value associated with a first pixel located at a boundary of a pixel group may be adjusted based on a second luminance prediction value and a second chrominance prediction value associated with a second pixel adjacent to the first pixel and outside the pixel group.

An embodiment may be related to a method for displaying an image. The method may include the following steps: deriving a quantized luminance value and a quantized chrominance value by decoding a bitstream; deriving an inverse quantized luminance value by inverse quantizing the quantized luminance value; deriving a luminance prediction value based on a luminance value of previous image data; generating a decoded luminance value by adding the inverse quantized luminance value and the luminance prediction value; deriving an inverse quantized chrominance value by inverse quantizing the quantized chrominance value; deriving a chrominance prediction value based on a chrominance value of the previous image data; generating a first decoded chrominance value by adding the inverse quantized chrominance value and the chrominance prediction value; selecting one of candidate coefficients as a modification factor; generating a second decoded chrominance value by adding the first decoded chrominance value and an addition value, the addition value being equal to the inverse quantized luminance value multiplied by the modification factor; and controlling a display device according to at least one of the first decoded chrominance value and the second decoded chrominance value to display the image.

In embodiments, an image encoding method and an image decoding method may include one or more of the following steps: determining a second chrominance residual when a first chrominance residual of a set of image data is relatively large, allocating a relatively large number of bits to a slice/sub-image when the compression difficulty of the slice/sub-image is relatively large, and applying a suitable quantization table in accordance with residual properties (i.e., luminance residual and chrominance residual), for optimizing image quality.

In embodiments, an image encoding method and an image decoding method may include searching a vector value for deriving a prediction value in a BP mode such that a similarity index is minimized. The luminance prediction value can be calculated efficiently, and/or the image encoder and image decoder can be implemented in relatively small sizes. The image encoder and decoder can derive image processing factors (such a modification factor, a compression difficulty, a quantization table data, etc.) using a previous line or previous frame data in substantially the same way or in analogous ways. Therefore, the image encoder does not need to add the image processing factors to bitstream transmitted to the image decoder. Advantageously, efficiency of data transmission for image encoding/decoding may be optimized.

In embodiments, an image encoding method and an image decoding method may include applying a smoothing filter and/or reducing a quantized value for a boundary of a pixel group. Advantageously, image distortion occurred at the boundary of the pixel group may be prevented or minimized.

DESCRIPTION OF EMBODIMENTS

Embodiments are described with reference to the accompanying drawings. In this application, "residual" may mean "residual value"; "property" may mean "property value";

"inverse quantize" may mean "perform inverse quantization on"; "inverse quantized . . . value" may mean "processed . . . value as a result of inverse quantization"; "derive" may mean "determine" or "obtain"; "first" may mean "first-set": "second" may mean "second-set"; "slice" may mean "sub-image" or "image portion"; "compression difficulty" may mean "compression difficulty value" or "compression difficulty index"; "indicate" may mean "represent" or "be".

Figure 1:
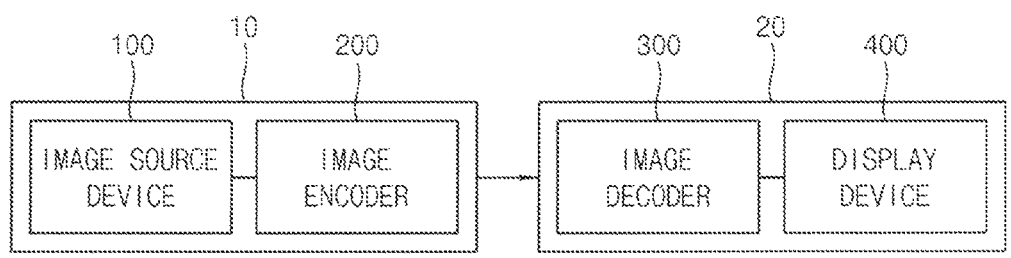
FIG. 1 is a block diagram illustrating an image encoding system/device and an image decoding system/device according to example embodiments.

FIG. 1 is a block diagram illustrating an image encoding system/device and an image decoding-displaying system/device according to example embodiments.

Referring to FIG. 1, the image encoding system 10 may include an image source device 100 and an image encoder 200. The image decoding-displaying system 20 may include an image decoder 300 and a display device 400.

The image source device 100 may provide image data to the image encoder 200. In one example embodiment, the image source device 100 may load the image data, stored in a storage device and may provide the loaded image data to the image encoder 200. In an example embodiment, the image source device 100 may be a video camera capturing an image and may provide the captured image data to the image encoder 200.

The image encoder 200 may generate a bitstream by encoding the image data and transmit the bitstream to the image decoder 300 through a display link, such as a display port.

The image decoder 300 may generate decoded image data by decoding the bitstream received from the image encoder 200 and provide the decoded image data to the display device 400.

The image encoder 200 and the image decoder 300 may generate a second chrominance residual when a first chrominance residual of the image data is relatively large. The image encoder 200 and the image decoder 300 may allocate a relatively large number of bits to a slice/sub-image (i.e., a portion of an image) when a compression difficulty of the slice is relatively high. In an embodiment, the image encoder 200 and the image decoder 300 may apply a differential quantization table in accordance with residual properties (i.e., luminance residual and chrominance residual). Advantageously, the image encoder 200 and the image decoder 300 can minimize image data loss and image quality degradation. In an embodiment, the image encoder 200 and the image decoder 300 may apply a smoothing filter in a boundary of a pixel group and may decrease a quantization parameter, thereby minimizing image distortion. In an example embodiment the image encoder/decoder 200 and 300 may perform image encoding/decoding for a pixel group including three pixels.

The image encoder 200 and the image decoder 300 may derive/determine image processing factors, such as one or more of a modification factor, compression difficulty data, quantization table data, etc., using previous line or previous frame data in substantially the same way. Therefore, the image encoder does not need to add image processing factors to bitstream transmitted to the image decoder 300. Advantageously, efficiency of image encoding/decoding may be maximized.

The display device 400 may display an image corresponding to the decoded image data received from the image decoder 300. For example, the display device 400 may include at least one of liquid crystal display (LCD), a plasma display panel (PDP), an organic light emitting display (OLED), etc. The display device 400 may include a control unit and switching units. The control unit may generate control signals according to the decoded image data and may provide the control signals to the switching devices. The switching devices may be controlled by the control signals for displaying the image.

Figure 2:
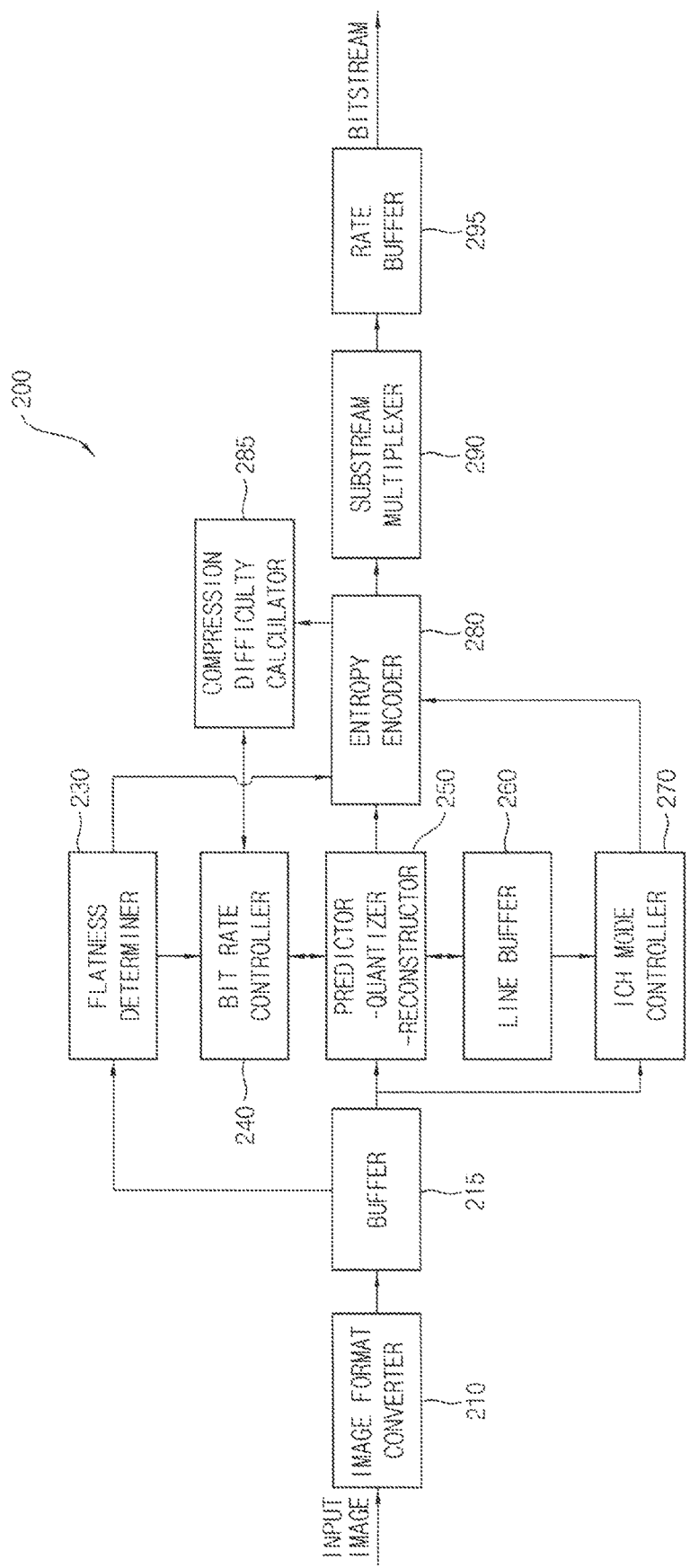
FIG. 2 is a block diagram, illustrating an image encoder according to example embodiments.

FIG. 2 is a block diagram illustrating an image encoder according to example embodiments.

Referring to FIG. 2, the image encoder 200 may include one or more of an image format converter 210, a buffer 215, a flatness determiner 230, a bit rate controller 240, a predictor-quantizer-reconstructor 250, a line buffer 260, an ICH (index color history) mode controller 270, an entropy encoder 280, a compression difficulty calculator 285, a substream multiplexer 290, and a rate buffer 295.

The image format converter 210 may convert a format of the input image data. In one example embodiment, the image format converter 210 may convert the format of the input image data from an RGB format to a YCoCg format. YCoCg data may include luminance data Y and chrominance data CoCg. The luminance data Y and chrominance data CoCg of original pixels can be derived by converting the format of the input image data from the RGB format to the YCoCg format. In an example embodiment, the image format converter 210 may convert the format of the input image data from an RGB format to a YCbCr format.

The buffer 215 may temporarily store the converted image data received from the image format converter 210 before the converted image data is used in the predictor-quantizer-reconstructor 250, etc.

The flatness determiner 230 may determine whether a quantization operation is moved from a region including pixels with relatively rough/choppy pixel values (or pixel data values) to a region including pixels with relatively smooth pixel values. The flatness determiner 230 and/or the bit rate controller 240 may adjust a quantization parameter based on the result of determination in the flatness determiner 230. Here, the pixel values represent digital data for pixels included in the display device to display an image corresponding to the image data.

The bit rate controller 240 may determine the quantization parameter and control a bit rate based on one or more of a status of the rate buffer 295, the number of bits used for the current prediction mode, the adjustment result of the quantization parameter, etc.

The one example embodiment, the bit rate controller 240 may select one among candidate quantization tables as the quantization table based on a difference value between an absolute average of luminance residual values and an absolute average of chrominance residual values, for improving image quality.

The one example embodiment, the bit rate controller 240 may decrease the quantization value or the quantization parameter in the boundary of a pixel group to reduce image distortion.

The predictor-quantizer-reconstructor 250 may derive/determine prediction values (i.e., a luminance prediction value and a chrominance prediction value) for pixels included in a current pixel group. The predictor-quantizer-reconstructor 250 may generate one or more residual property values (e.g., the luminance residual values and a chrominance residuals) indicating a difference between the prediction value and current image data and may quantize the residual property value(s). The predicter-quantizer-reconstructor 250 may inverse quantize (i.e., perform inverse quantization on) the quantized pixel value (or quantized pixel data value) to generate inverse quantized pixel value (or processed pixel value) and may store the inverse quantized pixel value in the line buffer 260. The inverse quantized pixel value may be used to derive/determine prediction values of other pixels. The predictor-quantizer-reconstructor 250 may reconstruct the inverse quantized pixel value such that a sum of the inverse quantized pixel value and the prediction value is in a predetermined range.

In one example embodiment the predictor-quantizer-reconstructor 250 may generate a second chrominance residual value when a first chrominance residual of an image is relatively large, in order to improve the image quality of the image.

In one example embodiment, the predictor-quantizer-reconstructor 250 may derive/determine a prediction value using one or more of an MMAP (Modified Median-Adaptive Prediction) mode, a BP (Block Prediction) mode, and an MPP (Midpoint Prediction) mode. The predictor-quantitizer-reconstructor 250 may search a vector value for deriving/determining the prediction value in the BP mode stage by stage, the vector value minimizing a similarity index (e.g., sum of absolute differences, SAD). Accordingly, the luminance prediction value can be calculated efficiently, and the image encoder 200 and image decoder 300 can be implemented in relatively small sizes.

In one example embodiment, the predictor-quantizer-reeoiistractor 250 may apply a smoothing filter to pixels positioned at/near a boundary of a pixel group and may decrease a quantization value for the pixels, thereby reducing an image distortion.

The line buffer 260 may store the pixel values for the previous line or previous frame. Here, the previous line indicates a line of pixels in which an encoding operation is previously performed ahead of the current line (including the current pixel group) for which an encoding operation is currently performed.

The ICH (index color history) mode controller 270 may determine whether the current pixel group is processed using an ICH mode. In the ICH mode, recently-used pixel values are stored, and the prediction value can be derived from the recently-used pixel values by directly accessing the recently-used pixel values using index values. The ICH mode may be suitable for a pattern or graphic that cannot be properly encoded using prediction modes and can be encoded with reference to pixel values of adjacent pixels.

The entropy encoder 280 may perform entropy encoding on the residual property value(s) of the pixel group and other encoded data. For example, the entropy encoder 280 may perform variable-length entropy coding for the residual property values and other encoded data of three pixels in the current pixel group.

The compression difficulty calculator 285 may calculate a compression difficulty value based on an average quantized value and/or a dispersion value of the previous image data for each of the slices/sub-images of an image. The compression difficulty calculator 285 may calculate a compression difficulty ratio of the compression difficulty value for each slice/sub-image to an average compression difficulty value of the slices/sub-images of the image. In an embodiment, the compression difficulty calculator 285 may provide a control value to enable the rate buffer 295, the image encoder 200, and or a bit rate controller 240 to adjust the number of bits allocated to each slice based on the compression difficulty ratio.

The substream multiplexer 290 may multiplex the bitstream based on a headerless packet multiplexing scheme.

The rate buffer 295 may temporarily store the bitstream to prevent bitstream loss during transmission.

Figure 3:
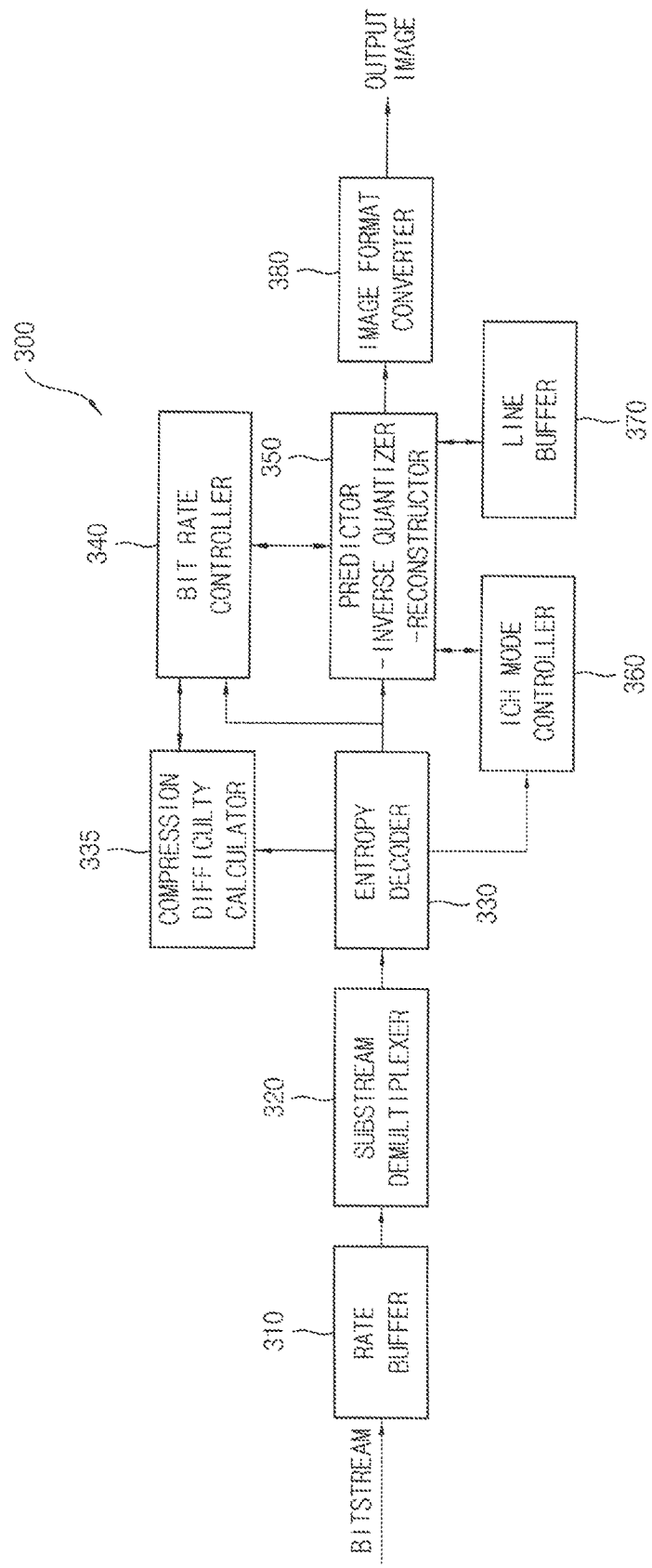
FIG. 3 is a block diagram illustrating an image decoder according to example embodiments.

FIG. 3 is a block diagram illustrating an image decoder according to example embodiments.

Referring to FIG. 3, the image decoder 300 may include one or more of a rate buffer 310, a substream demultiplexer 320, an entropy decoder 330, a compression difficulty calculator 335, a bit rate controller 340, a predictor-inverse quantizer-reconstructor 350, an ICH mode controller 360, a line buffer 370, and an image format converter 380.

The rate buffer 310 may temporarily store the bitstream to prevent bitstream loss during reception.

The substream demultiplexer 320 may demultiplex the bitstream based on a headerless packet multiplexing scheme.

The entropy decoder 330 may perform entropy decoding on the received bitstream.

The compression difficulty calculator 335 may calculate a compression difficulty ratio and may derive/determine the number of bits allocated to each slice in substantially the same manner as the compression difficulty calculator 285 included in the image encoder 200. For example, the compression difficulty calculator 335 may calculate a compression difficulty value based on an average quantized value and/or a dispersion value of the previous image data for each of the slices of an image. The compression difficulty calculator 335 may calculate a compression difficulty ratio of the compression difficulty value for each slice to an average compression difficulty value of the slices of the image. The compression difficulty calculator 335 may derive/determine the number of bits allocated to each slice based on the compression difficulty ratio.

The bit rate controller 340 may determine the quantization parameter and may control the bit rate based on one or more of the number of bits used for the current prediction, the adjusted quantization parameter, etc. The bit rate controller 340 may control the bit rate in substantially the same manner as the bit rate controller 240 included in the image encoder 200.

The predictor-inverse quantizer-reconstructor 350 may derive the prediction value based on the previous line or previous frame data stored in the line buffer 370 and may inverse quantize (i.e., perform inverse quantization on) the residual property values included in the bitstream to generate inverse quantized residual property values (or processed residual properly values). The predictor-inverse quantizer-reconstructor 350 may decode the pixel values of three pixels included in a current pixel group based on the prediction value and the inverse quantized residual property values (or processed residual property values). The predictor-inverse quantizer-reconstructor 350 may store the decoded pixel value in the line buffer 370 to be used to predict pixel values of other pixels.

In one example embodiment, the predictor-inverse quantizer-reconstructor 350 may perform substantially the same operations as the predictor-quantizer-reconstructor 250 included in the image encoder 200. The operations may include one or more of deriving/determining the prediction value, applying the smoothing filter, adjusting the quantization value, etc.

The ICH mode controller 360 may determine whether three pixels included in the current pixel group are processed using an ICH mode based on the encoded data derived from the bitstream.

The line buffer 370 may store the pixel values for the previous line or previous frame.

The image format converter 380 may convert a format of the decoded image data. The one example embodiment, the image format converter 380 may convert a/the format of the decoded image data from the/a YCoCg format to the/an RGB format. In an example embodiment, the image format converter 380 may convert the format of the decoded image data from a YCbCr format to an RGB format.

Figure 4:
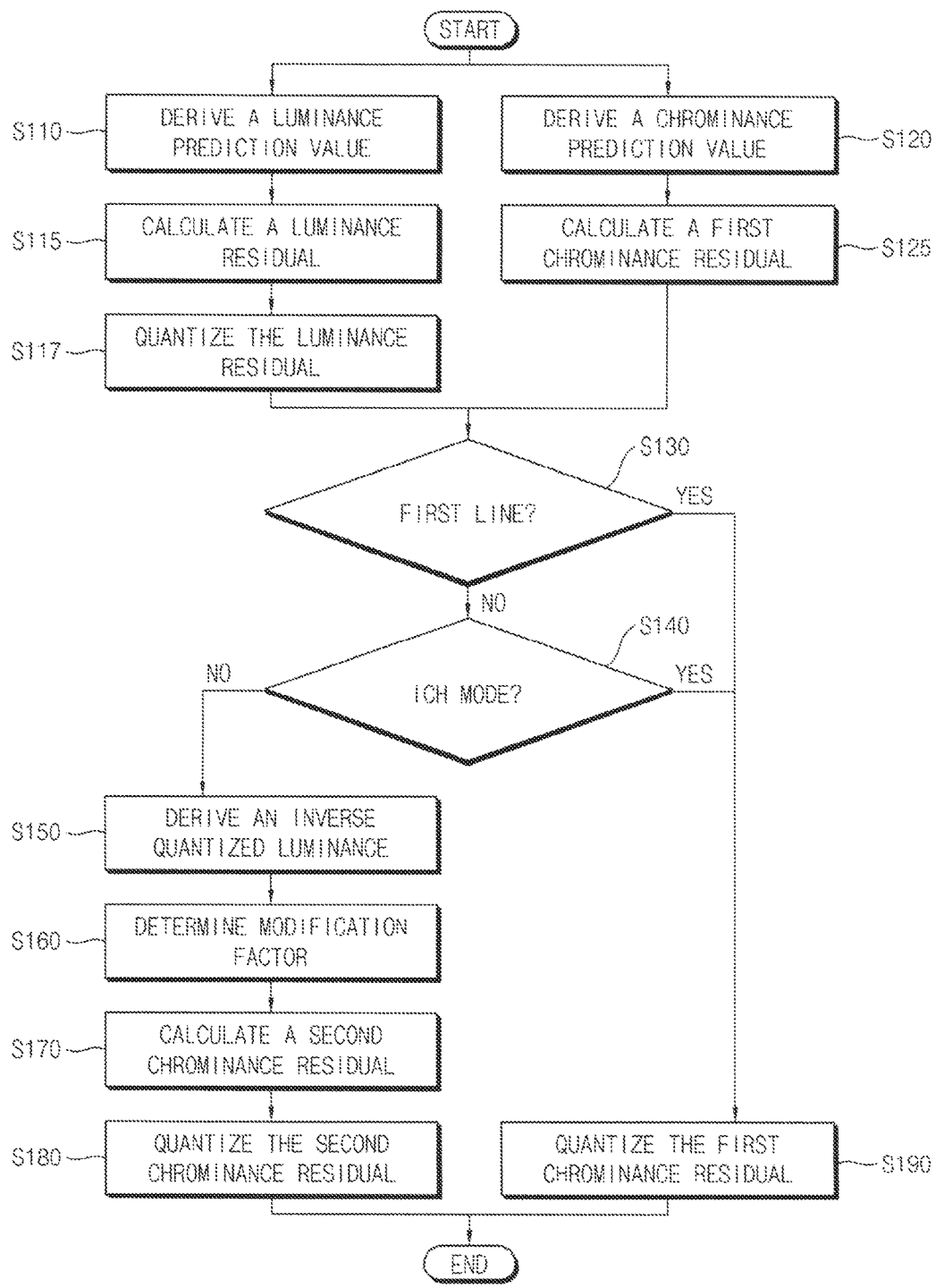
FIG. 4 is a flow chart illustrating an image encoding method according to example embodiments.
Figure 5:
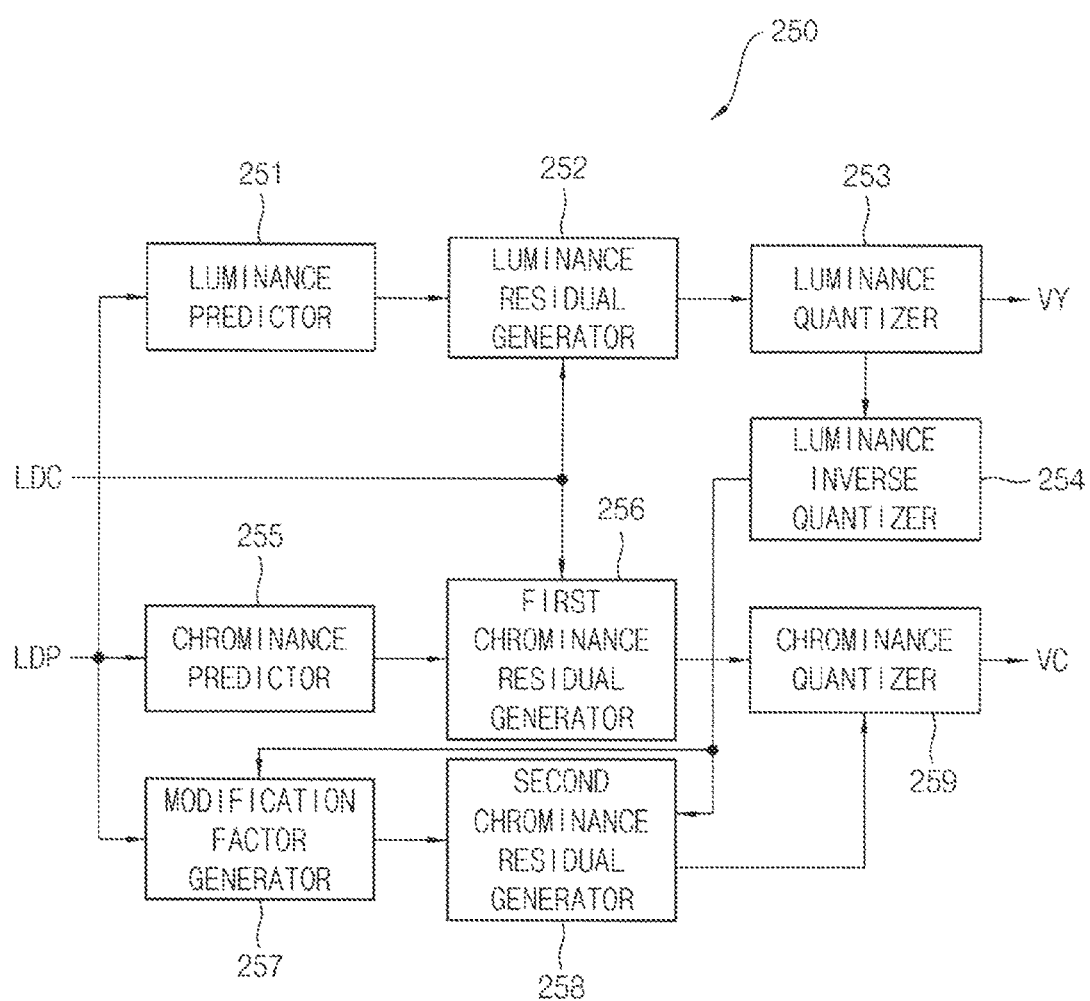
FIG. 5 is a block diagram illustrating an example of a predictor-quantizer-reconstructor for performing an image encoding method of FIG. 4 according to example embodiments.
Figure 6:
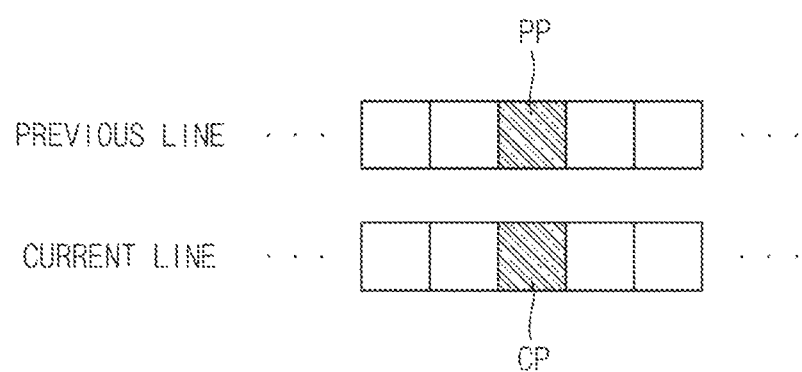
FIG. 6 is a diagram for describing a method of calculating a chrominance residual of a current pixel using a modification factor of a previous pixel according to example embodiments.

FIG. 4 is a flow chart illustrating an image encoding method according to example embodiments. FIG. 5 is a block diagram illustrating an example of a predictor-quantizer-reconstructor for performing an image encoding method of FIG. 4. FIG. 6 is a diagram for describing a method of calculating a chrominance residual (or chrominance residual value) of a current pixel using a modification factor of a previous pixel.

Referring to FIGS. 4 through 6, the image encoding method may include calculating a modification factor capable of minimizing a first chrominance residual (or first chrominance residual value) using a luminance residual (or luminance residual value) and may include calculating a second chrominance residual (or second chrominance residual value) based on the modification factor. Generally, when a luminance residual (or luminance residual value) is relatively large, a related chrominance residual (or related chrominance residual value) tends to be relatively large. Therefore, the second chrominance residual smaller than the first chrominance residual can be generated using the luminance residual. Accordingly, the image encoding method can increase the efficiency of the encoding operation by calculating the second chrominance residual in case that the efficiency of encoding operation using the first chrominance residual is relatively low. For example, when the image includes a lot of edges and a residual property value of the image is relatively large, the image quality degradation of the decoded image can be reduced/minimized using the second chrominance residual.

In an embodiment, the predictor-quantizer-reconstructor 250 may include one or more of a luminance predictor 251, a luminance residual generator 252, a luminance quantizer 253, a luminance inverse quantizer 254, a chrominance predictor 255, a first chrominance residual generator 256, a modification factor generator 257, a second chrominance residual generator 258, and a chrominance quantizer 259.

The luminance predictor 251 may derive/determine a luminance prediction value based on a luminance value of a set of previous image data LDP (S110). In one example embodiment, the luminance predictor 251 may derive/determine the luminance prediction value using one or more of an MMAP mode, a BP mode, and an MPP mode.

The luminance residual generator 252 may calculate a luminance residual by subtracting the luminance prediction value from a luminance value of a set of current image data LDC (S115).

The luminance quantizer 253 may derive/determine a quantized luminance value VY by quantizing the luminance residual based on a quantization parameter (S117)

The chrominance predictor 255 may derive/determine a chrominance prediction value based on a chrominance value of the previous image data LDP (S120). In one example embodiment, the chrominance predictor 255 may derive/determine the chrominance prediction value using one or more of an MMAP mode, a BP mode, and an MPP mode.

The first chrominance residual generator 256 may calculate a first chrominance residual (value) by subtracting the chrominance prediction value from a chrominance value of the current image data LDC (S125).

If the current pixel group corresponds to the first line (S130) or if the previous pixel group (corresponding to the previous line) corresponds to the/an ICH mode (S140), the chrominance quantizer 259 may derive/determine a quantized chrominance value VC by quantizing the first chrominance residual (S190).

On the other hand, if the current pixel group does not correspond to the first line and if the previous pixel group does not correspond to the/an ICH mode, the luminance inverse quantizer 254 may derive/determine an inverse quantized luminance value (or processed luminance value) by inverse quantizing (or performing inverse quantization on) the quantized luminance value (S150).

The modification factor generator 257 may select one among candidate coefficients as a modification factor (S160). In one example embodiment, the candidate coefficients may be between −1 and 1 and may correspond/equal to $m/2^n$, where n and m are integers, in order to reduce operation load using a shift operation instead of a division operation. The modification factor may be determined among the candidate coefficients such that a difference between the first chrominance residual and an adjustment value is minimized, wherein the adjustment value is equal to the inverse quantized luminance value multiplied, by the modification factor. Thus, the modification factor may be determined to minimize the second chrominance residual.

In one example embodiment, as shown in FIG. 6, the modification factor for a current pixel CP of a current line may be calculated using a pixel value of a previous pixel PP of a previous line stored in the line memory. In an embodiment, the image decoder can determine the modification factor using the same method used by the image encoder. Therefore, the image encoder does not need to add the modification factor to bitstream transmitted to the image decoder. Advantageously, efficiency of data transmission for image encoding/decoding may be optimized.

The second chrominance residual generator 258 may calculate a second chrominance residual by subtracting an adjustment value from the first chrominance residual, wherein the adjustment value is equal the inverse quantized luminance value multiplied by the modification factor (S170). Thus, the second chrominance residual generator 258 may calculate a second chrominance residual according to [Equation 1]

$$ResCo'=ResCo-\alpha_{co}*Q^{-1}(ResY),$$

$$ResCg'=ResCg-\alpha_{cg}*Q^{-1}(ResY) \qquad \text{[Equation 1]}$$

where ResCo' and ResCg' indicate/represent, are second chrominance residuals (or second-set chrominance residual values), ResCo and ResCg indicate/represent/are first chrominance residuals (or first-set chrominance residual values), $\alpha_{co}$ and $\alpha_{cg}$ indicate/represent/are modification factors, Q indicates/represents a quantization function, $Q^{-1}$ indicates/represents an inverse quantization function, and ResY indicates/represents a luminance residual (or luminance residual value).

The image decoder 300 can calculate a modification factor using a method analogous to steps discussed above with reference to FIG. 4 and performed the image encoder. The image decoder 300 can perform image decoding by generating a second chrominance residual using an inverse quantized luminance value instead of a luminance residual.

The chrominance quantizer 259 may derive/determine a quantized chrominance value VC by quantizing the second chrominance residual (S180).

In one example embodiment when if the luminance residual determined at step S115 is lesser than a predetermined threshold value, the chrominance quantizer 259 may derive/determine the quantized chrominance value by quantizing the first chrominance residual without calculating the second chrominance residual.

In one example embodiment, when/if a prediction mode of the current pixel group of the current line differs from a prediction mode of the previous pixel group of the previous line, the chrominance quantizer 259 may derive/determine the quantized chrominance value by quantizing the first chrominance residual without calculating the second chrominance residual.

Thereafter, the quantized luminance value and the quantized chrominance value may be encoded by the entropy encoder into encoded data. The image encoder 200 may output the encoded data in a bitstream to the image decoder 300.

Figure 7:
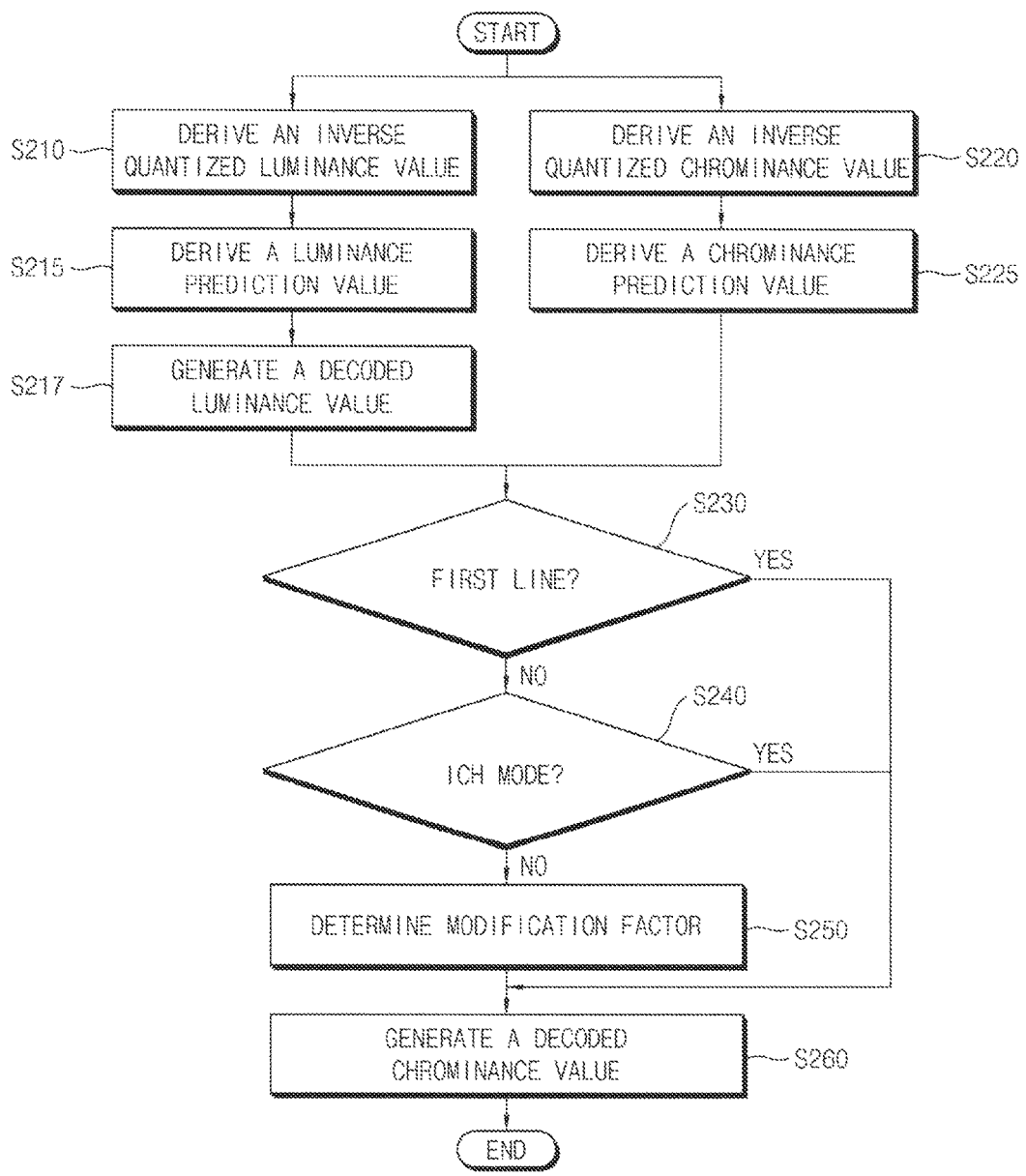
FIG. 7 is a flow chart illustrating an image decoding method according to example embodiments.
Figure 8:
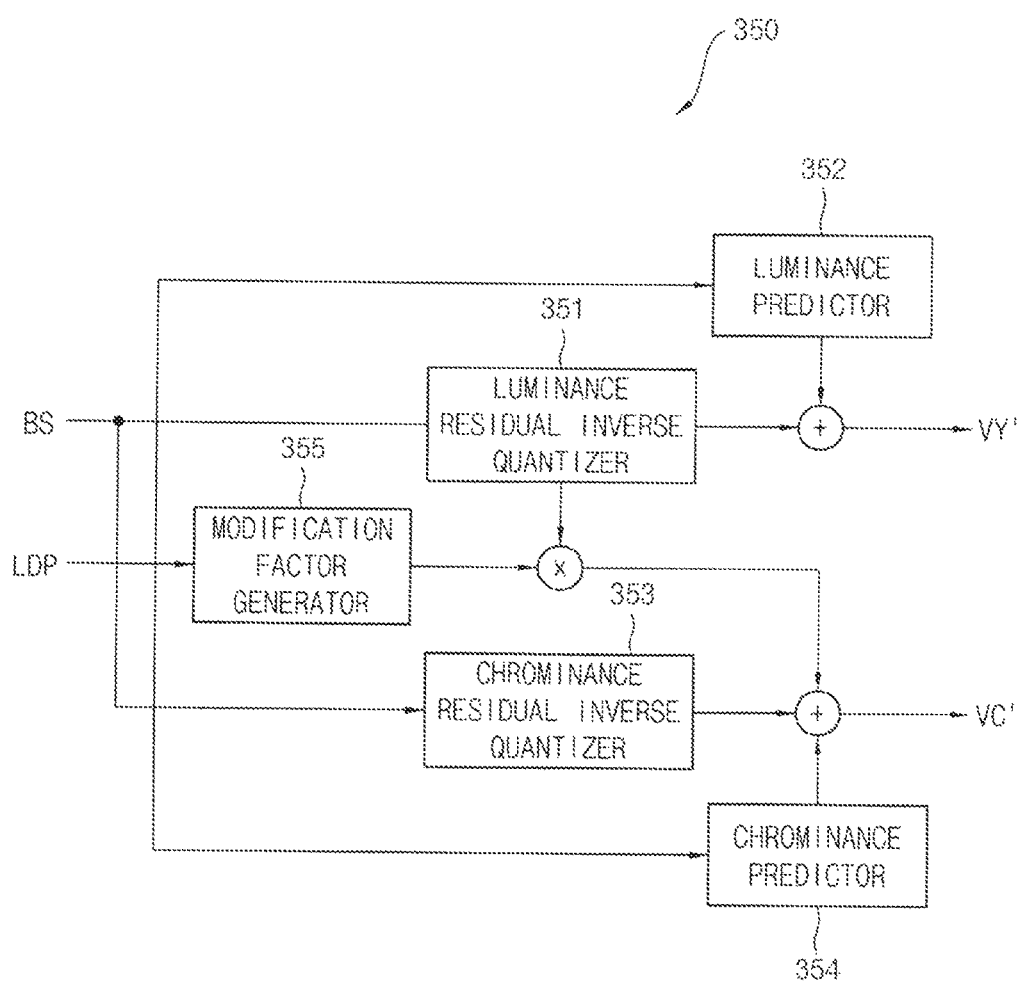
FIG. 8 is a block diagram illustrating an example of a predictor-quantizer-reconstructor performing an image decoding method of FIG. 7 according to example embodiments.

FIG. 7 is a flow chart illustrating an image decoding method according to example embodiments. FIG. 8 is a block diagram illustrating an example of a predictor-quantizer-reconstructor for performing an image decoding method of FIG. 7.

Referring to FIGS. 7 and 8, the image decoding method may include calculating a modification factor using steps analogous to steps in the image encoding method illustrated in FIG. 4, and the image decoding method may include calculating decoded image data based on the modification factor.

In an embodiment, the predictor-inverse quantizer-reconstructor 350 may include a luminance residual inverse quantizer 351, a luminance predictor 352, a chrominance residual inverse quantizer 353, a chrominance predictor 354, and a modification factor generator 355.

The luminance residual inverse quantizer 351 may receive a quantized luminance value derived/decoded from a bitstream BS by the entropy decoder 330 and may derive/determine an inverse quantized luminance value by inverse quantizing the quantized luminance value (S210).

The luminance predictor 352 may derive a luminance prediction value based on a luminance value of a set of previous image data LDP (S215).

A decoded luminance value VY' may be generated by adding/summing the inverse quantized luminance value and the luminance prediction value (S217).

The chrominance residual inverse quantizer 353 may derive an inverse quantized chrominance value by inverse quantizing the quantized chrominance value (S220).

The chrominance predictor 354 may derive a chrominance prediction value based on a chrominance value of the previous image data LDP (S225).

If the current pixel group corresponds to the first line (S230) or if the previous pixel group of the previous line corresponds to the/an ICH mode (S240), a decoded chrominance value VC may be generated by adding the inverse quantized chrominance value and the chrominance prediction value (S260).

On the other hand, if the current pixel group does not correspond to the first line and if the previous pixel group of the previous line does not correspond to ICH mode, the modification factor generator 355 may determine a modification factor by selecting one among candidate coefficients (S250). In one example embodiment, the candidate coefficients may be between −1 and 1 and may correspond/equal to $m/2^n$, where n and m are integers. An operation load can be reduced using a shift operation instead of a division operation. The modification factor may be determined among the candidate coefficients such that a difference between the first chrominance residual for previous pixel and an adjustment value is minimized, wherein the adjustment value may be equal to the inverse quantized luminance value multiplied by the modification factor.

A first decoded chrominance value may be generated by adding the inverse quantized chrominance value and the chrominance prediction value, and a second decoded chrominance value may be generated by adding the first decoded chrominance value and an addition value, wherein the addition value is equal to the inverse quantized luminance value multiplied by the modification factor (S260).

Figure 9:
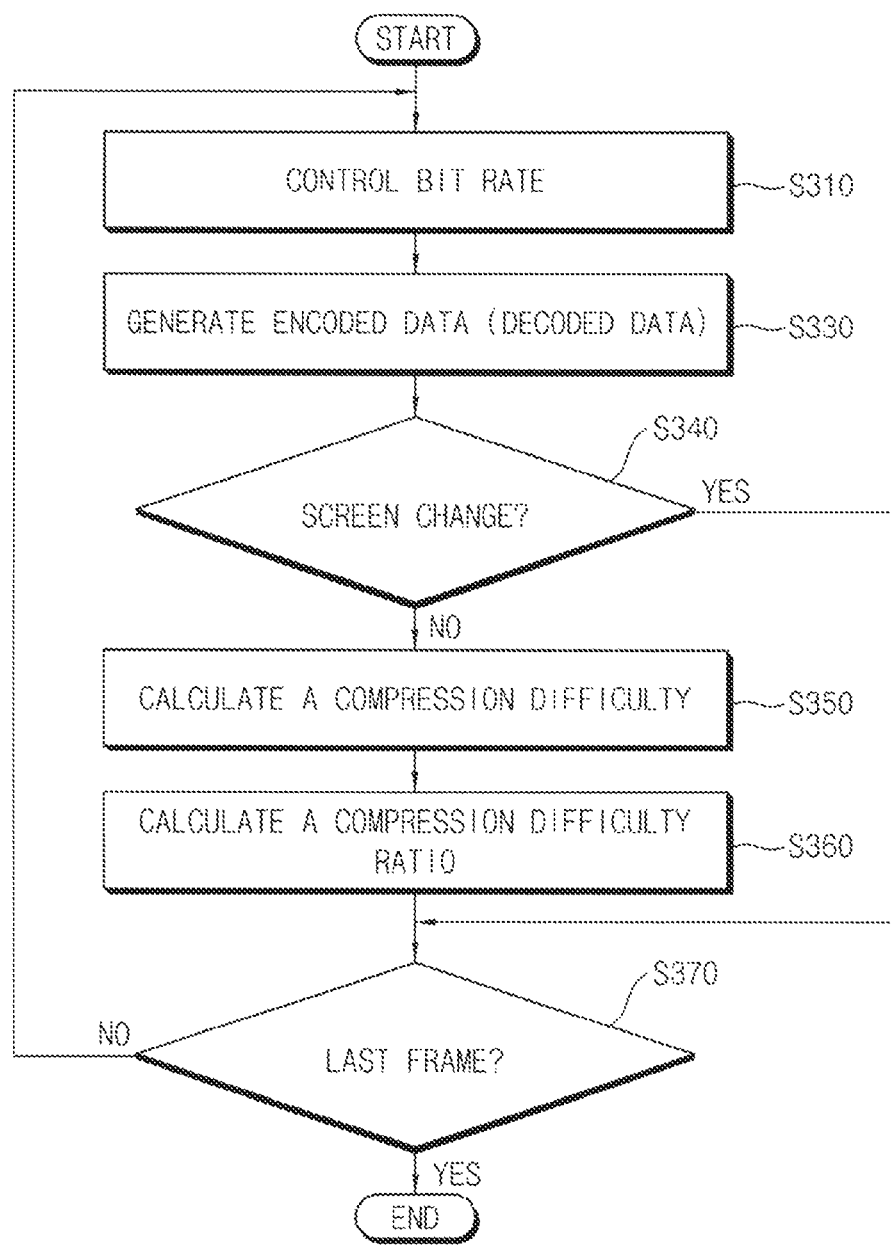
FIG. 9, FIG. 10, and FIG. 11 are diagrams for describing a method of adjusting number of bits allocated to each of slices sub-image in image encoding/decoding method according to example embodiments.
Figure 10:
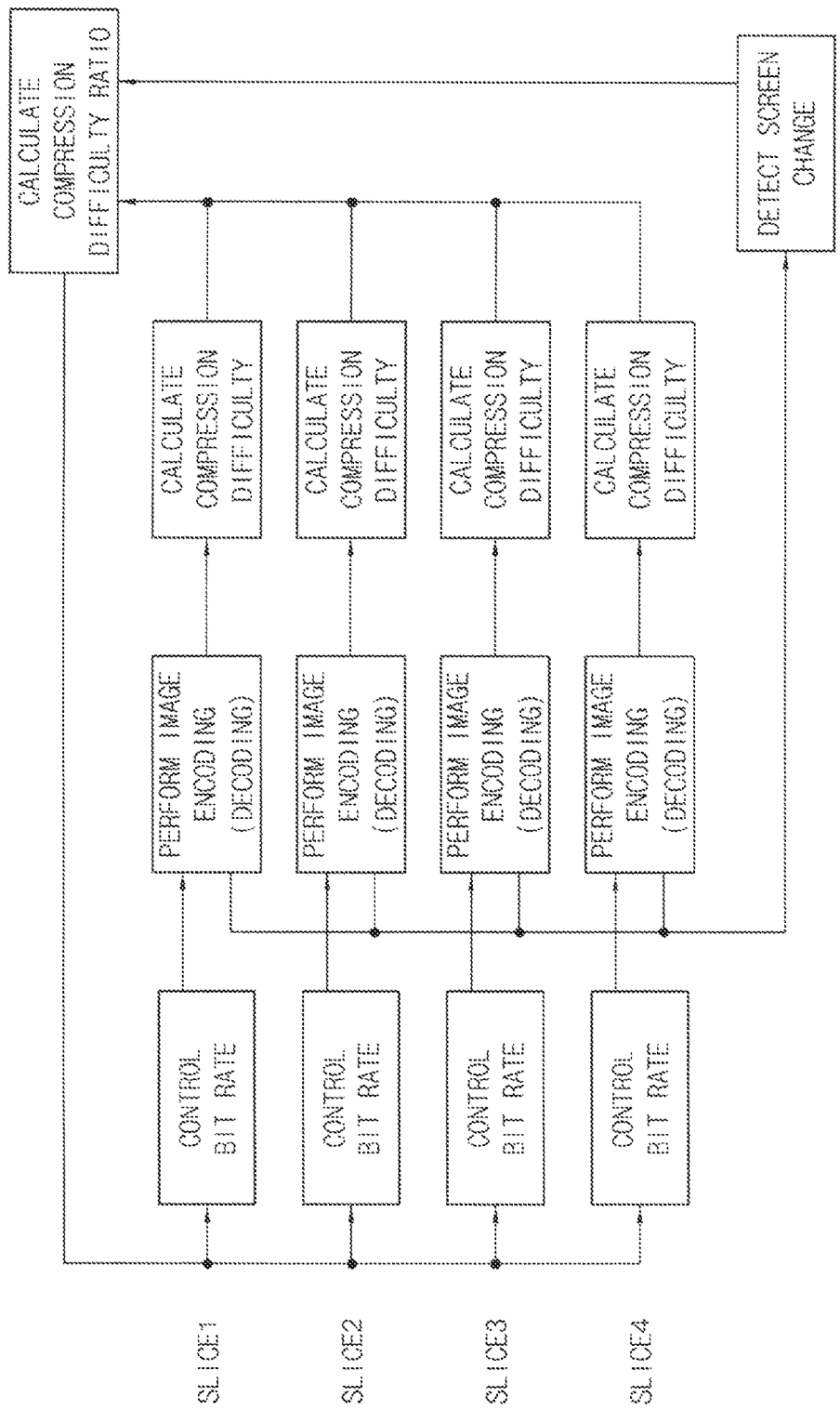
Figure 11:
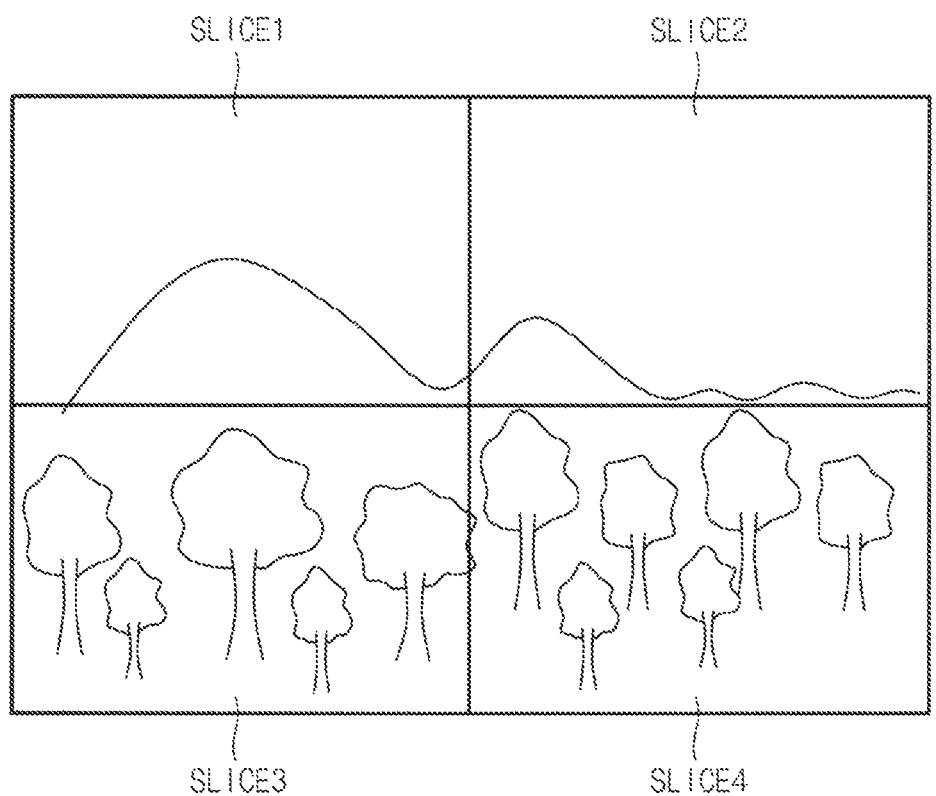

FIGS. 9 through 11 are diagrams for describing a method of adjusting a number of bits allocated to each of slices in an image encoding/decoding method.

Referring to FIGS. 9 through 11, an image encoding method and an image decoding method may divide one image into a plurality of slices and perform image processing operations for each of slices in parallel. For example, the image may be divided in to four slices SLICE1, SLICE2, SLICE3, and SLICE4. In an embodiment, the image encoding method and the image decoding method may allocate the number of bits to each slice in accordance with a compression difficulty of each slice to improve the image quality. The manner of allocating the number of bits of the image encoding method is substantially identical or analogous to the manner of bit allocation in the image decoding method. Therefore, bit allocation in the image encoding method is described as an illustrative example.

In each of the slices SLICE1 through SLICE4, the bit rate may be controlled by the bit rate controller 240 based on one or more of a status of the rate buffer 295, the number of bits used for the current prediction mode, etc. (S310), and then the quantized luminance value and the quantized chrominance value may be converted into encoded data by the entropy encoder 280 (S330).

If the screen (i.e., displayed image) is changed (S340), the number of bits for each slice may not be adjusted regardless of compression difficulty. For example, when an image difference between previous frame data and current frame data is greater than a reference value, it is determined that the screen is changed. In an embodiment, a flag indicating whether previous frame data is used or not is set in the bitstream. When the screen is changed, the numbers of bits for all slices are set to the same value (e.g., 6 bits for each pixel).

On the other hand, if the screen is not changed, a compression difficulty (value) may be calculated based on an average quantized value of the previous image data for each of the slices SLICE1 through SLICE4 (S350).

For example, the compression difficulty may be calculated according to [Equation 2].

$$\text{DIFFICULTY(SLICE\_K)}=\text{BIT(SLICE\_K)}*\text{AvgQ(SLICE\_K)} \quad\quad\quad [\text{Equation 2}]$$

where DIFFICULTY(SLICE_K) indicates the compression difficulty of the (K)th slice. BIT(SLICE_K) indicates the number of bits of the (K)th slice, AvgQ(SLICE_K) indicates the average quantized value of the (K)th slice. The average quantized value of the (K)th slice represents an average of quantized values of image data for pixels included in the (K)th slice/sub-image.

A compression difficulty ratio for each of the slices SLICE1 through SLICE4 may be calculated (S360), and whether the current frame is/corresponds to the last frame is determined (S370) in order to calculate the compression difficulty ratio for each slice in every frame. In an embodiment, the compression difficulty ratio indicates the ratio of the compression difficulty of each slice to the average compression difficulty. For example, the compression difficulty ratio may be calculated according to [Equation 3].

DIFFICULTY_SCALE(SLICE_$K$)=DIFFICULTY
(SLICE_$K$)/AVG_DIFFICULTY   [Equation 3]

where DIFFICULTY_SCALE(SLICE_K) represents the compression difficulty ratio of the (K)th slice, DIFFICULTY (SLICE_K) represents the compression difficulty of the (K)th slice, and AVG_DIFFICULTY indicates the average compression difficulty of the slices For example, as shown in FIG. 11, because the slices SLICE1 and SLICE2 have a relatively low texture, the compression difficulty and the compression difficulty ratio of the slices SLICE1 and SLICE2 may be relatively small. For example, the compression difficulty ratio of the slices SLICE1 and SLICE2 may be 0.8. On the other hand, became the slices SLICE3 and SLICE4 have a relatively high texture, the compression difficulty and the compression difficulty ratio of the slices SLICE3 and SLICE4 may be relatively large. For example, the compression difficulty ratio of the slices SLICE3 and SLICE4 may be 1.2.

In one example embodiment, the compression difficulty ratio may be converted to a value corresponding/equal to m/2$^n$, where n and m are integers. The above example, the compression difficulty ratio of the slices SLICE1 and SLICE2 may adjusted as 0.75 (i.e., ¾) adjacent to 0.8; the compression difficulty ratio of the slices SLICE3 and SLICE4 may adjusted as 1.25 (i.e., 5⁄4) adjacent to 1.2. Accordingly, an operation load can be reduced using a shift operation instead of a division operation.

In one example embodiment, the compression difficulty for each slice may be calculated using a pixel value of previous frame ahead of the current frame. In an embodiment, the image decoder can calculate the compression difficulty in substantially the same manner as the image encoder. Therefore, the image encoder does not need to add the compression difficulty to bitstream transmitted to the image decoder. Advantageously, efficiency of data transmission for image encoding/decoding may be optimized.

The number of bits allocated to each slice may be adjusted based on the compression difficulty ratio. In above example, when the reference number of bits is 6 bits, the number of bits allocated to the slices SLICE1 and SLICE2 may be 5 bits (i.e., round(6*0.8)=5) and the number of bits allocated to the slices SLICE3 and SLICE4 may be 7 bits (i.e., round(6*1.2)=7).

Although the example embodiments of FIGS. 9 through 11 describe that the compression difficulty is derived based on the average quantized value, if is not limited thereto. For example, the compression difficulty can be derived based on a dispersion degree of the pixel values. Here, the pixel values represent digital data for pixels included in the display device to display an image corresponding to the image data.

Figure 12:
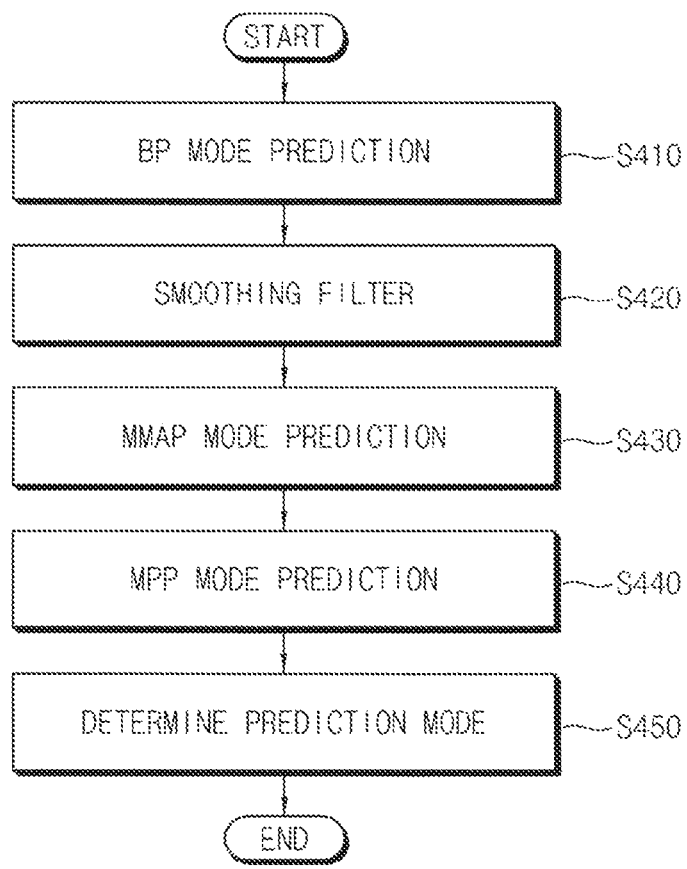
FIG. 12 is a flow chart illustrating an example of a method of deriving/determining a luminance prediction value according to example embodiments.
Figure 13:
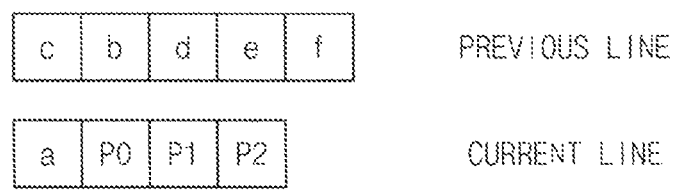
FIG. 13 is a diagram for describing a MMAP (Modified Median Adaptive Prediction) prediction mode in a method of deriving a luminance prediction value of FIG. 12 according to example embodiments.

FIG. 12 is a flow chart illustrating an example of method of deriving a luminance prediction value. FIG. 13 is a diagram for describing a MMAP (Modified Median Adaptive Prediction) prediction mode in a method of deriving a luminance prediction value of FIG. 12.

Referring to FIGS. 12 and 13, the image encoder and the image decoder can derive the prediction values (i.e., the luminance prediction value and the chrominance prediction value) in various manners. For example, the image encoder and the image decoder may derive the luminance prediction value and the chrominance prediction value using one or more of an MMAP mode, a BP mode, and an MPP mode. The BP mode derives the prediction values of pixels in the current pixel group with reference to values of the pixel (or pixel group) corresponding to the vector value. Therefore, in the BP mode manner, image distortion may occur in a boundary of a pixel group because pixel values are predicted from one or more pixel groups that are not adjacent to the current pixel group. Therefore, the image encoder and the image decoder can apply a smoothing filter to the prediction values derived by BP mode manner.

A first prediction value may be derived using a BP mode (S410). For example, the prediction values of the first through third pixels included in the current pixel group may be derived according to [TABLE/CODE 1].

TABLE/CODE 1

P [hPOS] = recon[hPos+vpVector]
vpVector: −3~−10

A vector value (vpVector) may be determined, and the prediction values of pixels in the current pixel group may be derived with reference to value of the pixel corresponding to the vector value (vpVector). A reference index (hPos) indicates an index corresponding to a position of the current pixel. For example, when the reference position index (hPos) is 0, the reference position index (hPos) corresponds to the first pixel of the current pixel group. The prediction value (P[hPos]) of the first pixel may be predicted using the pixel value of a pixel of which the index is the reference position index (hPOS)+the vector value (vpVector)', and the prediction value (P[hPos]) may be changed according to the vector value (vpVector) (e.g., a value in a range of −3 to −10), The method of calculating the prediction value using a BP mode will be described in more detail with reference to the FIGS. 14 through 18.

A smoothing filter may be applied to the first prediction value (S420). Thus, the prediction value of the first pixel located at/near the boundary of the pixel group may be adjusted based on the prediction value of an external adjacent pixel adjacent to the first pixel and outside the pixel group. For example, the prediction value adjusted by the smoothing filter of the first pixel located at the boundary of the pixel group may be calculated according to [Equation 4] or [Equation 5].

$$P_0'=(P_{-1}+3*P_0+2)>>2 \quad \text{[Equation 4]}$$

$$P_0'=(P_{-1}+2*P_0+P_1+2)>>2 \quad \text{[Equation 5]}$$

where $P_0'$ indicates the adjusted prediction value of a pixel located at the boundary of the pixel group, $P_{-1}$ indicates the prediction value of an external adjacent pixel outside the pixel group $P_1$ indicates the prediction value of an adjacent pixel inside of the pixel group, and $P_0$ indicates the prediction value of pixel located at the boundary of the pixel group.

A second prediction value may be derived using an MMAP mode (S430). For example, referring to FIG. 13, the prediction values of the first through third pixels included in the current pixel group may be derived as P0, P1, and P2 according to [TABLE/CODE 2].

TABLE/CODE 2

```
//Noise Reduction
filtB = (c + 2 * b + d + 2) >> 2;
//Noise Reduction is Bounded by QLEVEL
diffC = CLAMP(filtC − c, −QuantDivisor(qLevel) / 2,
QuantDivisor(qlevel) / 2):
blendC = c + diffC;
diffB = CLAMP(filtB − b, −QuantDivisor(qLevel) / 2,
QuantDivisor(qlevel) / 2);
blendB = b + diffB;
```

TABLE/CODE 2-continued

```
diffD = CLAMP(filtD - d, -QuantDivisor(qLevel) / 2,
QuantDivisor(qlevel) / 2);
blendD = d + diffD;
diffE = CLAMP(filtE - e, -QuantDivisor(qLevel) / 2,
QuantDivisor(qlevel) / 2);
blendE = e + diffE;
// P0, P1, P2 can be decoded in parallel
P0 = CLAMP(a + blendB - blendC, MIN(a, blendB),
MAX(a, blendB));
P1 = CLAMP(a + blendD - blendC + R0, MIN(a, blendB,
blendD), MAX(a, blendB, blendD));
P2 = CLAMP(a + blendE - blendC + R0 + R1, MIN(a, blendB,
blendD, blendE), MAX(a, blendB, blendD, blendE));
//For the first line in Slice
P0 = a;
P1 = CLAMP(a + R0, 0, (1<< cpntBitDepth) - 1);
P2 = CLAMP(a + R0 + R1, 0, (1<< cpntBitDepth) -1);
```

Thus, the prediction values may be derived using a pixel 'a' adjacent to the pixel group of the current line and pixels 'c', 'b', 'd', 'e', 'f' of previous line of which pixel value are stored in the line buffer.

Here, −QuantDivisor[qLevel]/2, QuantDivisor[qLevel]/2 respectively indicate minimum quantizable value and maximum quantizable value. The CLAMP(a, b, c) function indicates a function outputting 'a' in case that 'a' is between 'b' and 'c', outputting 'b' in case that 'a' is smaller than 'b', and outputting 'c' in case that 'a' is greater than 'c'. The cpnBitDepth variable indicates the maximum number of bits per one channel.

For example, filtered output value filtB of pixel 'b' may be determined using a pixel 'b', a left pixel 'c' adjacent to pixel 'b', and a pixel 'd' adjacent, to pixel 'b'. Also, filtered output values filtC, filtD, filtE for each pixel 'c', 'd', 'e' may be determined in the same way.

A diffC related to pixel 'c' may be determined using filtC, a value of pixel 'c', the maximum quantizable value, and the minimum quantizable value. For example, diffC may be determined as a value subtracting value of pixel 'c' from filtC between the minimum quantizable value and the maximum quantizable value. In the similar way, diffB, diffD, diffE may be determined.

A blendC related to pixel 'c' may be determined using diffC and the value of pixel 'c'. In the similar way, blendB, blendD, blendE may be determined.

In an embodiment, the prediction value P0 of the first pixel of the current pixel group may be determined using the value of the pixel 'a', blendB, and blendC. The prediction value P1 of the second pixel of the current pixel group may be determined using the value of the pixel 'a', blendB, blendC, blendD, and the residual R0 of the first pixel. The prediction value P2 of the third pixel of the current pixel group may be determined using the value of the pixel V, blendB, blendC, blendD, blendE, the residual R0 of the first pixel, and residual R1 of the second pixel.

When the current pixel group is in the first line, there is no previous line. In this case, the prediction value P0 of the first pixel may be determined as the value of pixel 'a'; the prediction value P1 of the second pixel may be determined using the value of the pixel 'a', the residual R0 of the first pixel, and cpnBitDepth indicating the maximum number of bits per one channel; the prediction value P2 of the third pixel may be determined using the value of the pixel 'a', the residual R0 of the first pixel, the residual R1 of the second pixel, and cpnBitDepth indicating the maximum number of bits per one channel.

A third prediction value may be derived using an MPP mode (S440). For example, the prediction values of the first through third pixels included in the current pixel group may be derived according to [TABLE/CODE 3].

TABLE/CODE 3

```
P = (1 << (cpntBitDepth - 1)) + (prevRecon & ((1 << qLevel) -1));
```

Thus, the prediction value P for the current three bits may be determined using a value (prevRecon) of a pixel prior to the pixel group of the current line (i.e., pixel 'a' of FIG. S13), the maximum number of bits per one channel (cpnBitDepth), and the quantization parameter (qLevel). The an embodiment, the prediction value is derived rising an MPP mode, and a magnitude of the residual property is set to a difference between the maximum number of bits per one channel (cpnBitDepth) and the quantization parameter (qLevel).

One selected prediction mode among the MMAP mode, the BP mode, and the MPP may be determined (S450). In an example embodiment, the MPP mode may be selected as the prediction mode when a maximum residual of three pixels included in the pixel group is greater than or equal to the difference between the maximum number of bits per one channel (cpnBitDepth) and the quantization parameter (qLevel). In an example embodiment, the MMAP mode may be selected as the prediction mode when the vector value derived using the BP mode is smaller than −3. In embodiments, the prediction mode can be determined according to various conditions.

Although the example embodiments of FIGS. 12 through 13 describe that the smoothing filter is applied in a BP mode, if is not limited thereto. For example, the smoothing filter can be applied pixels adjacent to the boundary of the pixel group in the ICH mode.

Figure 14:
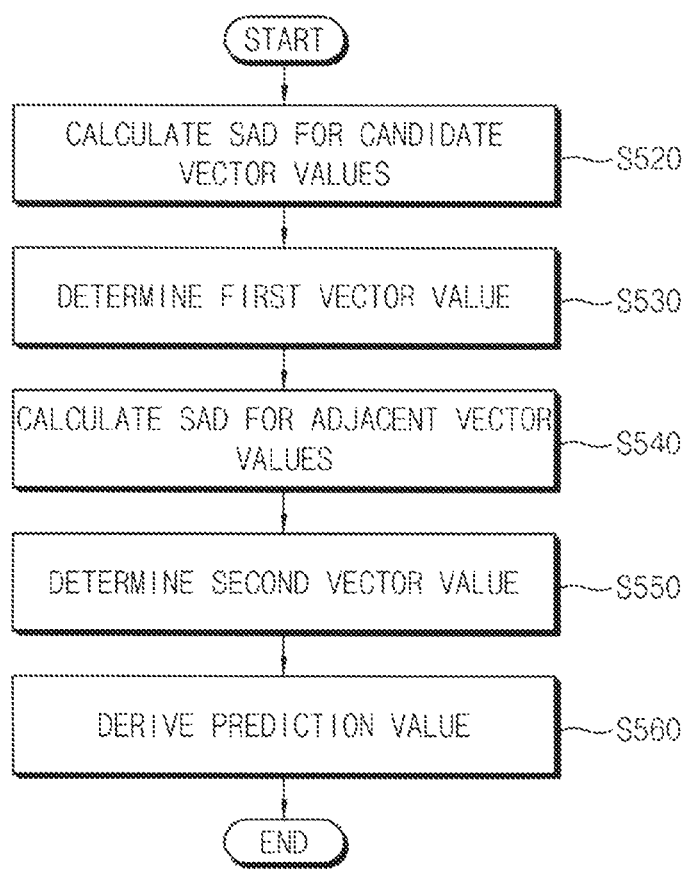
FIG. 14 is a diagram (e.g., flow chart) for describing a BP (Block Prediction) prediction mode in a method of deriving a luminance prediction value of FIG. 12 according to example embodiments.
Figure 15A:
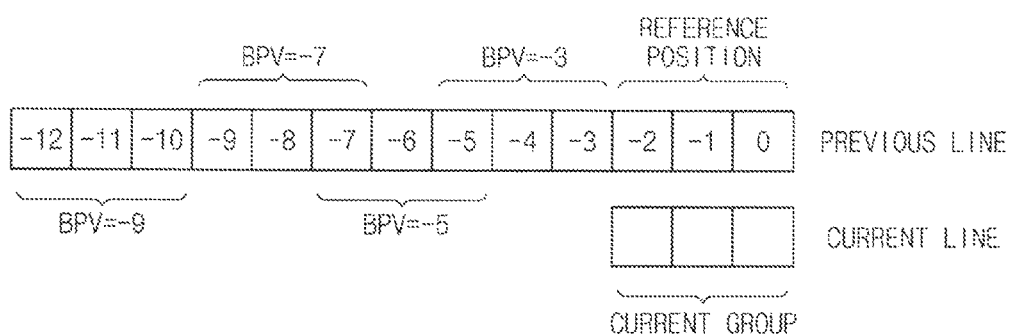
FIG. 15A and FIG. 15B are diagrams for describing an example of BP prediction mode according to example embodiments.
Figure 15B:
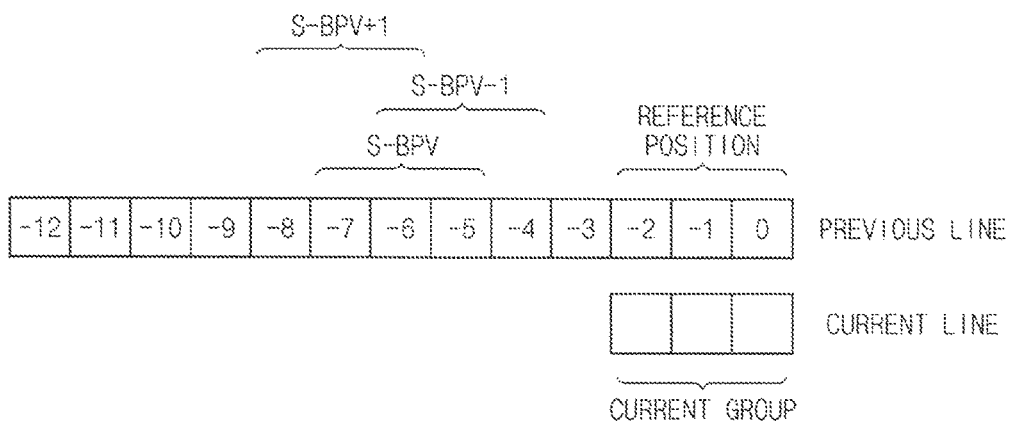
Figure 16A:
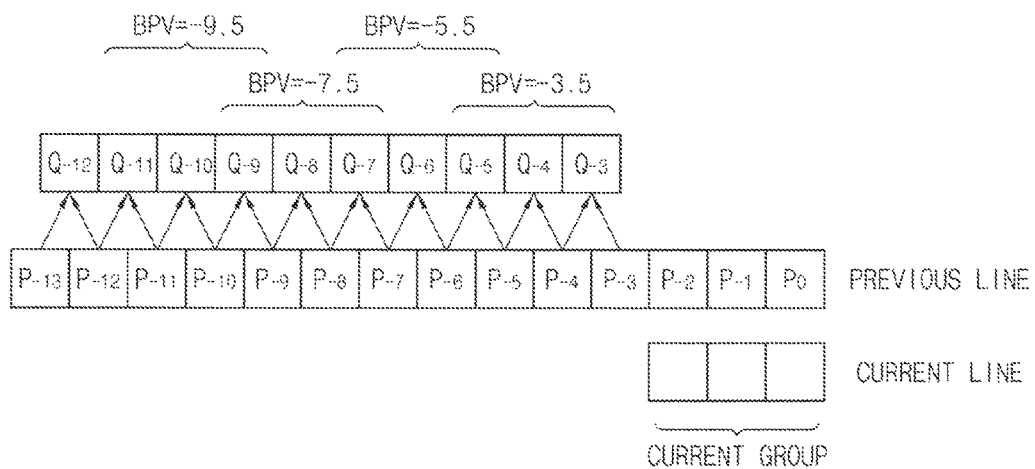
FIG. 16A and FIG. 16B are diagrams for describing an example of BP prediction mode according to example embodiments.
Figure 16B:
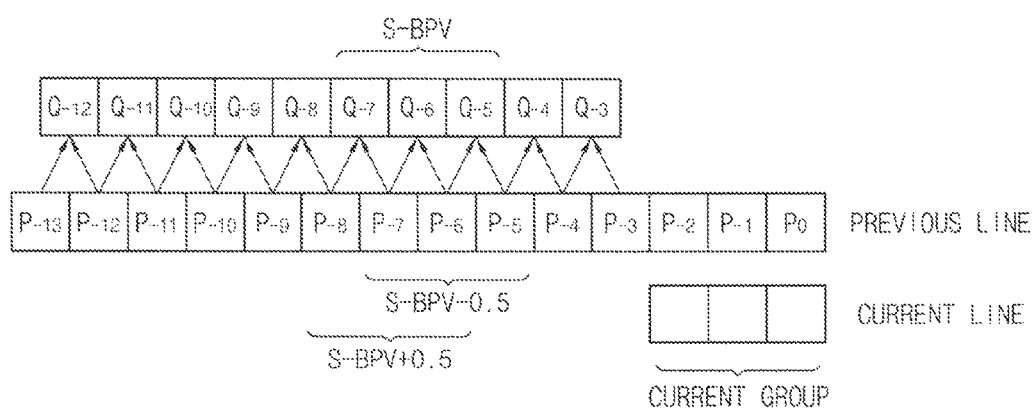

FIG. 14 is a diagram (e.g., flow chart) for describing a BP (Block Prediction) prediction mode in a method of deriving a luminance prediction value of FIG. 12. FIGS. 15A and 15B are diagrams for describing one example of BP prediction mode. FIGS. 16A and 16B are diagrams for describing another example of BP prediction mode.

Referring to FIGS. 14, 15A, 15B, 16A, and 16B, the image encoding method and the image decoding method may search a vector value for minimizing SAD stage by stage. Accordingly, the luminance prediction value can be calculated more efficiently, and the image encoder and image decoder can be implemented in relatively small sizes. The embodiments, the intervals between candidate vector values are not equally set to 1 (e.g., {−3, −4, −5, −6, −7, −8, −9, −10}), but the intervals between the candidate vector values may have different sizes and/or may have one or more predetermined sizes greater than 1, in order to efficiently calculate the luminance prediction value. In one example embodiment, the image encoding method and the image decoding method may derive the prediction value of the current line using the previous line using a BP mode. In an embodiment, the image decoder can derive the prediction value using substantially the same method used by the image encoder. Therefore, the image encoder does not need to add information including the vector value to bitstream transmitted to the image decoder. Advantageously, efficiency of data transmission for image encoding/decoding may be optimized.

Referring to FIGS. 14, 15A, and 15B, the candidate vector values may be set {−3, −5, −7, −9} such that each interval between the candidate vector values is 2. The similarity index (e.g., sum of absolute differences, SAD) between a pixel value corresponding to one of candidate vector values and a pixel value corresponding to a reference position may be calculated (S520). The similarity index between the pixel value corresponding to one of the candidate vector values and the pixel value corresponding to the reference position may be calculated according to [Equation 6].

$$SAD=|P_{-2}-P_{BPV-2}|+|P_{-1}-P_{BPV-1}|+|P_0-P_{BPV}|$$ [Equation 6]

where SAD indicates the similarity index between a reference position (0) and a candidate vector value (BPV); Pk indicates a pixel value of pixel located in index k.

A first vector value (S-BPV) can be determined such that the similarity index (e.g., SAD) between the pixel value corresponding to one of the candidate vector values and the pixel value corresponding to a reference position is minimized (S530). For example, the first vector value (S-BPV) may be determined as −5.

The similarity index between a pixel value corresponding to one of the first vector value and vector values adjacent to the first vector value and the pixel value corresponding to a reference position may be calculated (S540). For example, the similarity indexes corresponding to the first vector value (S-BPV) (e.g., −5) and adjacent vector values S-BPV−1 (e.g., −6) and S-BPV+1 (e.g., −4) adjacent to the first vector value (S-BPV) may be calculated according to [Equation 6].

A second vector value may be determined such that the similarity index between a pixel value corresponding to one of the first vector value and vector values adjacent to the first vector value and the pixel value corresponding to the reference position is minimized (S550). For example, the second vector value may be determined as −6.

The luminance prediction value and the chrominance prediction value may be derived based on the second vector value (S560). For example, in accordance with [TABLE/CODE 1], when the second vector value is −6, the prediction value may be derived using pixel values corresponding to indexes −6, −7, −8.

Although the example embodiments of FIGS. 14, 15A, and 15B describe that the each interval between the candidate vector values is 2, if is nest limited thereto. For example, intervals between candidate vector values may increase as distances between the reference position and the candidate vector values increase.

Referring to FIGS. 14, 16A, and 16B, median values of pixel values of pixels that are adjacent to each other may be calculated. For example, the median values may be calculated according to [Equation 7].

$$Q_{-1}=(P_{-1}-P_{-2}+1)>>2$$ [Equation 7]

where Qk indicates a median value of pixel values corresponding to index k and index (k−1), and Pk indicates a pixel value corresponding to index k. For example, vector value −3.5 corresponds to median value $\{Q_{-3}, Q_{-4}, Q_{-5}\}$.

The candidate vector values (BPV) may be set to {−3.5, −5.5, −7.5, −9.5} such that the interval between the candidate vector values is set to 2. The similarity index between the median value corresponding to one of candidate vector values and the pixel value corresponding to the reference position may be calculated (S520).

A first vector value (S-BPV) may be determined such that the similarity index between the median value corresponding to one of the candidate vector values and the pixel value corresponding to the reference position is minimized (S530). For example, the first vector value (S-BPV) may be determined as −5.5.

The similarity index between a pixel value corresponding to one of the first vector value and adjacent vector values adjacent to the first vector value and the pixel value corresponding to the reference position may be calculated (S540), For example, the similarity indexes corresponding the first vector value S-BPV (e.g., −5.5) and adjacent vector values S-BFV−0.5 (e.g., −6) and S-BPV-+0.5 (e.g., −5) adjacent to the first vector value S-BPV may be calculated according to [Equation 6].

A second vector value may be derived such that the similarity index between a pixel value corresponding to one of the first vector value and vector values adjacent to the first vector value and the pixel value corresponding to the reference position is minimized (S550). For example, the second vector value may be determined as −6.

The luminance prediction value and the chrominance prediction value may be derived based on the second vector value (S560). For example, in accordance with [TABLE/CODE 1], when the second vector value is −6, the prediction value may be derived using pixel values corresponding to indexes −6, −7, −8.

Therefore, the interval of the candidate vector is set to greater than 1 instead of setting all indexes in the reference range as the candidate vector values, and the vector value for minimizing the similarity index is searched stage by stage. Advantageously, the amount of SAD calculation may be minimized, and efficiency of image encoding/decoding may be optimized.

Figure 17:
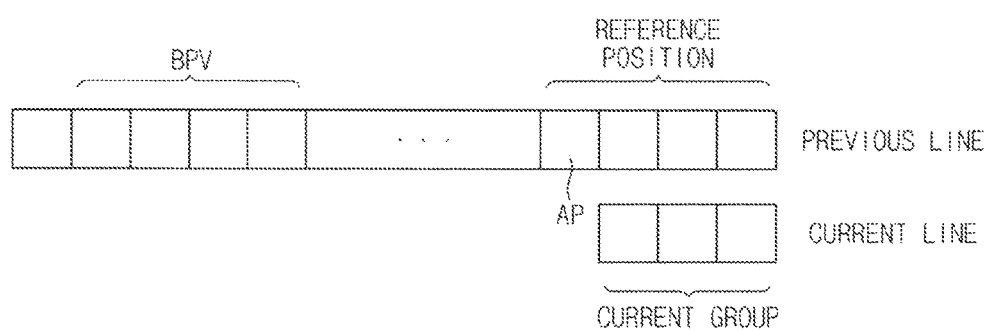
FIG. 17 and FIG. 18 are diagrams for describing examples of determining vector values in a BP prediction mode of FIG. 14 according to example embodiments.
Figure 18:
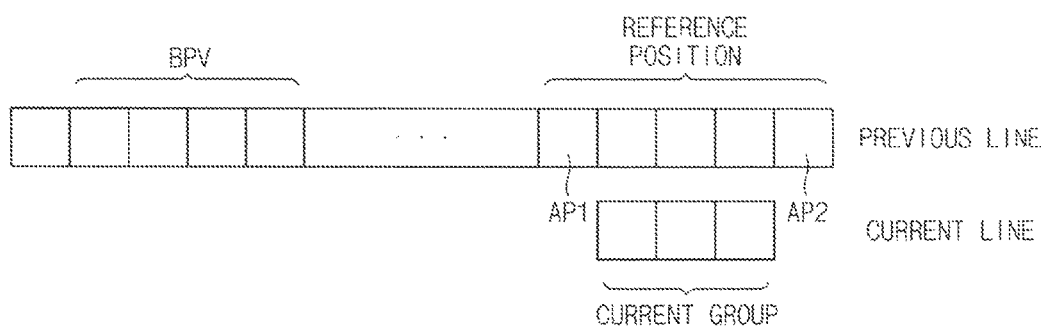

FIGS. 17 and 18 are diagrams for describing examples of determining vector values in a BP prediction mode of FIG. 14.

Referring to FIGS. 17 and 18, the similarity index may be generated by calculating the SAD between the pixel value of pixels included in the pixel group or adjacent to the pixel group and the pixel value of pixel located in the reference position. External pixels adjacent to the pixel group are used to calculate the similarity index, for minimizing image distortion at the boundary of the pixel group.

In one example embodiment, referring to FIG. 17, the similarity index may be generated by calculating SAD of four pixels including pixels included in the pixel group and an adjacent pixel AP adjacent to the pixel group at one side. In an example embodiment, referring to FIG. 18, the similarity index may be generated by calculating SAD of five pixels including three pixels included in the pixel group and two adjacent pixels AP1 and AP2 adjacent to the pixel group at two sides.

Figure 19:
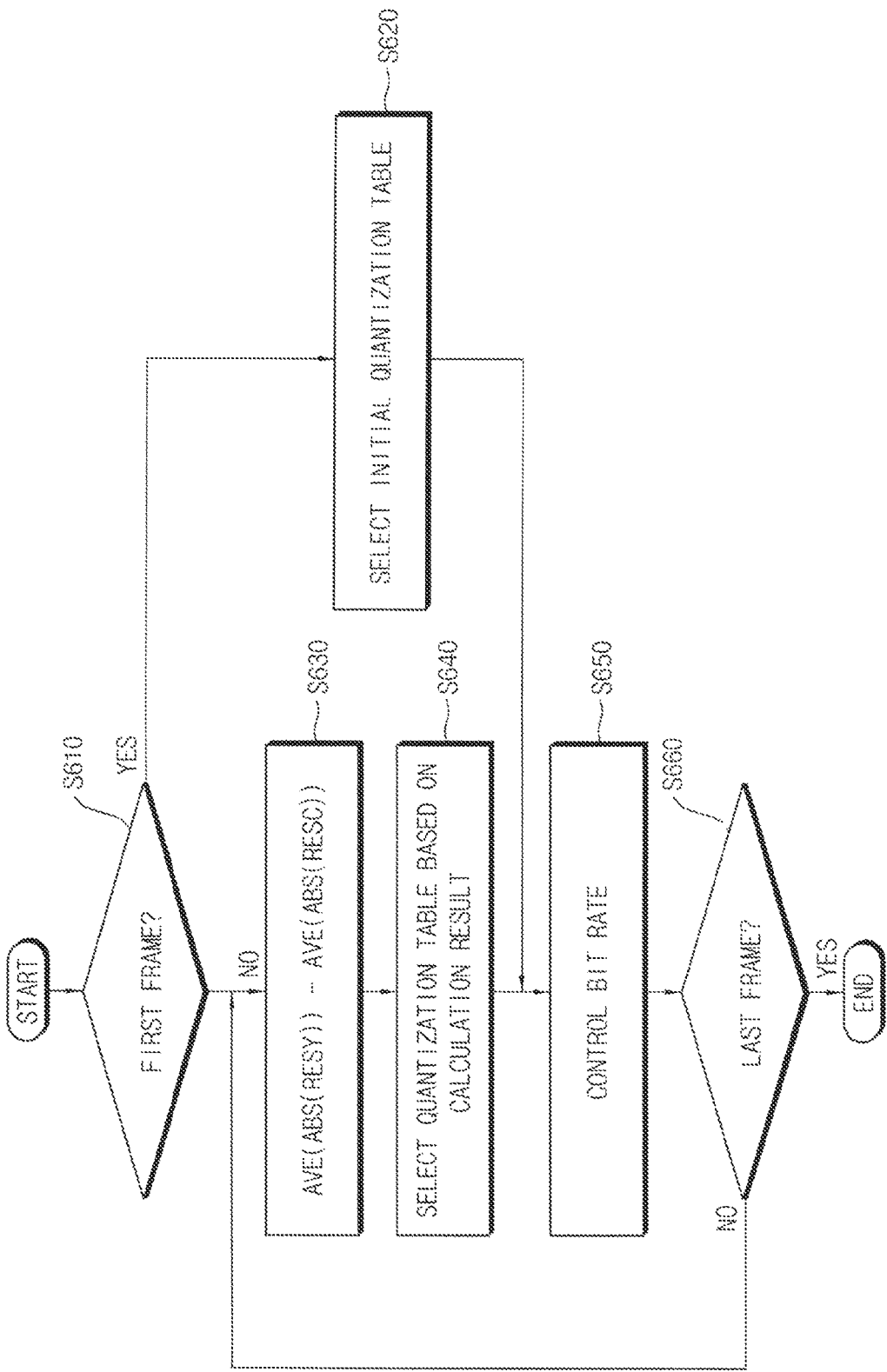
FIG. 19 and FIG. 20 are diagrams for describing a method of selecting a quantization table according to example embodiments.
Figure 20:
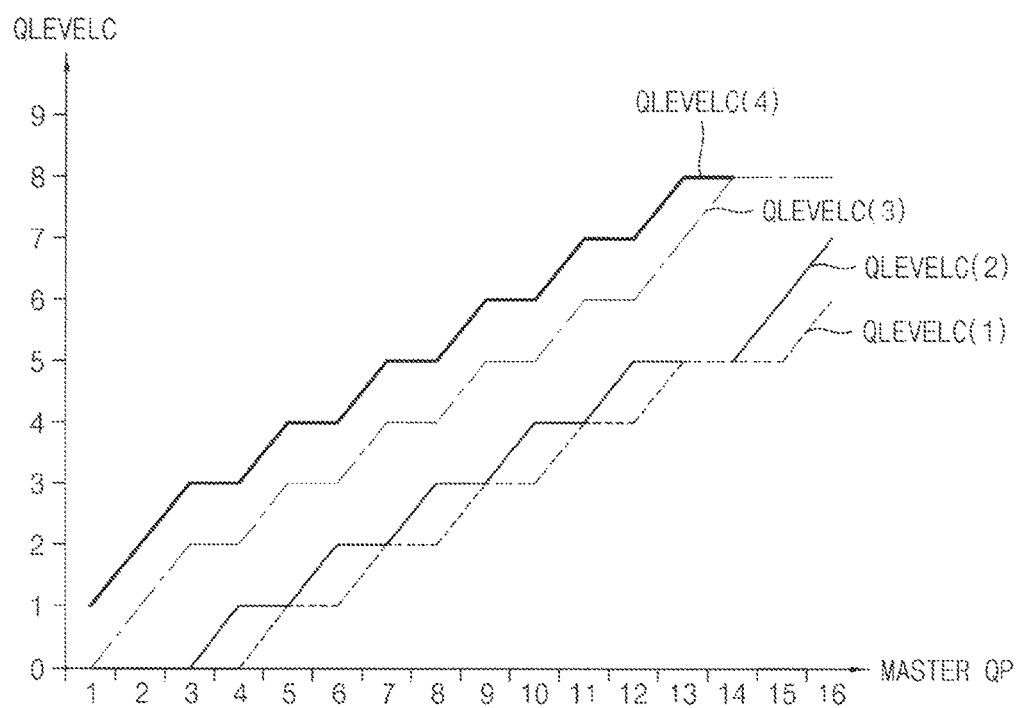

FIGS. 19 and 20 are diagrams for describing a method of selecting a quantization table.

Referring to FIGS. 19 and 20, the quantization parameter may be adjusted according to image characteristics to improve the image quality. The quantization table for the pixel group in a current line may be selected using a pixel value of a previous pixel group in the previous line stored in the line memory. In an embodiment, the image decoder can select the quantization table using substantially the same method used by the image encoder. Therefore, the image encoder does not need to add information of the quantization table or the quantization parameter to bitstream transmitted to the image decoder. Advantageously, efficiency of data transmission for image encoding/decoding may be optimized.

In an embodiment the image encoder or the image decoder may confirm whether the image data corresponds to the first frame in order to derive the quantized value or the inverse quantized value (S610).

If the image data corresponds to the first frame, an initial quantization table may be selected as the quantization table (S620).

On the other hand, If the image data does not correspond to the first flame, a difference value between an absolute average of the luminance residual and an absolute average of the chrominance residual may be calculated (S630), and one of the candidate quantization tables may be selected as the quantization table based on the difference value (S640).

In one example embodiment, referring to FIG. 20, there are four candidate quantization tables indicating relationships between a master quantization parameter MASTER_QP and chrominance quantization parameters QLEVEL(1) through QLEYELC(4). For example, the quantization table may be selected according to [TABLE/CODE 4],

TABLE/CODE 4

DIFF = AVE(ABS(RESY)) − AVE(ABS(RESC))
if (DIFF > TH1)
    QLEVELC = QLEVELC(4);
else if (DIFF > TH2)
    QLEVELC = QLEVELC(3);
else if (DIFF > TH3)
    QLEVELC = QLEVELC(2)
else
    QLEVELC = QLEVELC(1);

The difference value (DIFF) between the absolute average (AYE(ABS(RESY))) of the luminance residual and the absolute average (AVE(ABS(RESC))) of the chrominance residual may be calculated. If the difference value (DIFF) is greater than the first threshold value (TH1), then the fourth candidate quantization table of which chrominance quantization parameter is relatively large may be selected and the chrominance quantization parameter (QLEVELC) may be set to the fourth chrominance quantization parameter (QLEVEL(4)). If the difference value (DIFF) is smaller than or equal to the first threshold value (TH1) and greater than the second threshold value (TH2), then the third candidate quantization table of which chrominance quantization parameter is smaller than the chrominance quantization parameter of the fourth candidate quantization table may be selected and the chrominance quantization parameter (QLEVELC) may be set to the third chrominance quantization parameter (QLEVEL(3)). If the difference value (DIFF) is smaller than or equal to the second threshold value (TH2) and greater than the third threshold value (TH3), then the second candidate quantization table of which chrominance quantization parameter is smaller than the chrominance quantization parameter of the third candidate quantization table may be selected and the chrominance quantization parameter (QLEVELC) may be set to the second chrominance quantization parameter (QLEVEL(2)). If the difference value (DIFF) is smaller than or equal to the third threshold value (TH3), then the first candidate quantization table of which chrominance quantization parameter is relatively small may be selected and the chrominance quantization parameter (QLEVELC) may be set to the first chrominance quantization parameter (QLEVEL(1)).

The quantization parameter may be derived from the quantization table, and the bit rate may be controlled (S650). In addition, whether the frame corresponds to last frame is determined (S660), in order to select a proper quantization table in every frame.

The quantization (or inverse quantization operation) may quantize (or inverse quantize) the luminance residual and chrominance residual based on the quantization parameter. For example, the quantization operation may perform a right shift operation with residual property based on the quantization parameter, and the inverse quantization operation may perform a left shift operation with residual property based on the quantization parameter.

Although the example embodiments of FIGS. 19 and 20 describe that the chrominance quantization parameter is adjusted based on the selected quantization table, it is not limited thereto. For example, the luminance quantization parameter is adjusted or both of the luminance quantization parameter and the chrominance quantization parameter are adjusted based on the selected quantization table.

Figure 21:
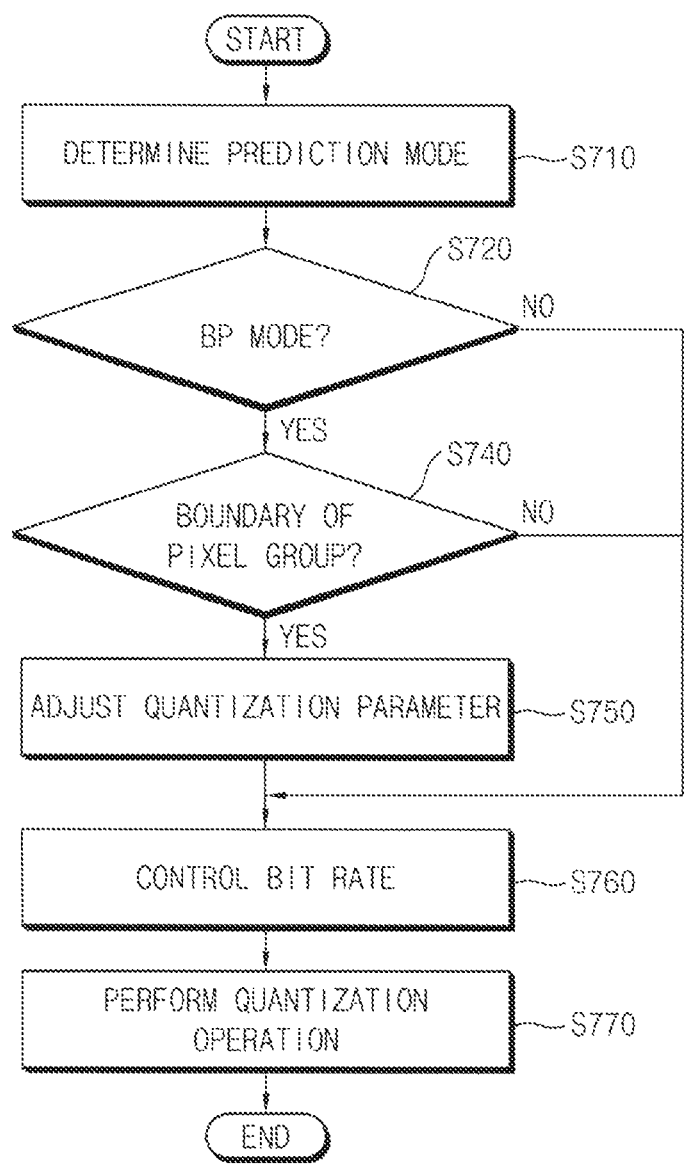
FIG. 21 and FIG. 22 are diagrams for describing a method of adjusting a quantization parameter according to example embodiments.
Figure 22:
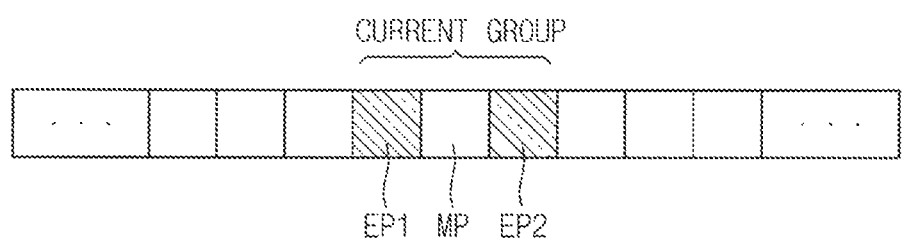

FIGS. 21 and 22 are diagrams for describing a method of adjusting a quantization parameter.

Referring to FIGS. 21 and 22, the quantization parameter for a pixel located at/adjacent to a boundary of pixel group may be adjusted. In an embodiment, when the luminance prediction value is derived using a BP mode, the image distortion can occur at the boundary of a pixel group. To prevent this problem, the quantization parameter for boundary pixels EP1 and EP2 located at the boundary of pixel group may be decreased. In an embodiment, the image quality in a central pixel MP located in the central portion of the pixel group can decrease. However, the image distortion and image quality degradation in the boundary pixels EP1 and EP2 can be substantially prevented. As a result, overall image quality can be optimized.

In an embodiment, the prediction mode can be determined to derive the luminance prediction value (S710). For example, one or more of an MMAP mode, a BP mode, and an MPP mode may be selected as the prediction mode.

Whether the prediction mode is BP mode is determined (S720), and whether a current pixel is a boundary pixel EP1 or EP2 located at a boundary of a pixel group is determined (S740).

When the prediction mode is a BP mode, the quantization parameter for the boundary pixel EP1/EP2 may be adjusted (S750). For example, the adjusted quantization parameter for the boundary pixel EP1/EP2 may be calculated by subtracting an offset value from the quantization parameter for the boundary pixel EP1/EP2. For example, the adjusted quantization parameter may be calculated by subtracting the offset value from at least one of the master quantization parameter; the luminance quantization parameter, and the chrominance quantization parameter.

In one example embodiment, the offset value of the quantization parameter may be only set when the quantization parameter is greater than a predetermined reference value. Image quality degradation may be relatively insignificant and may not be recognized when the quantization parameter is relatively small. Therefore, the offset value for decreasing the quantization parameter can be set only in case that the quantization parameter is greater than the reference value.

In one example embodiment the offset value may increase as the luminance quantization parameter increases. Image quality degradation may be more significant as the quantization parameter increases. Therefore, image quality degradation can be reduced by increasing the offset value as the quantization parameter increases. In an example embodiment, a predetermined offset value may be applied, to the quantization parameter.

In one example embodiment the luminance quantization parameter may be adjusted for a boundary pixel EP1/EP2, and the chrominance quantization parameter may be not adjusted. In general, luminance is more recognizable more in comparison with chrominance, and luminance quantization parameter is adjusted only to reduce the load of image processing.

In one example embodiment, the luminance quantization parameter and or the chrominance quantization parameter for the boundary pixel EP1 may be adjusted using a first set of offset values, and the luminance quantization parameter and/or the chrominance quantization parameter for the boundary pixel EP2 may be adjusted using a second set of offset values different from the first set of offset values.

The quantization parameter may be derived from a (selected) quantization table, and the bit rate may be controlled (S760). The luminance residual and the chrominance residual may be quantized based on the subtracted quantization parameter (S770).

Embodiments can be applied to a variety of image Codec.

Embodiments may be applied to an electronic device having the image encoder/decoder. For example, embodiments may be applied to one or more of a television, a personal computer, a notebook computer, a cellular phone, a smart phone, a smart pad, etc.

The foregoing is illustrative of example embodiments and is not to be construed as limiting thereof. Although example embodiments have been described, those skilled in the art will readily appreciate that many modifications are possible in the example embodiments without materially departing from the novel teachings and advantages of the example embodiments. All such modifications are intended to be included within the scope defined in the claims.

What is claimed is:

1. A method for displaying an image, the method comprising:
    deriving a luminance prediction value based on a luminance value of previous image data, wherein the previous image data corresponds to a previous frame or a previously processed line of pixels for which an encoding operation is previously performed;
    calculating a luminance residual by subtracting the luminance prediction value from a luminance value of current image data, wherein the current image data corresponds to a current frame or a currently processed line of pixels;
    deriving a chrominance prediction value based on a chrominance value of the previous image data;
    calculating a first chrominance residual by subtracting the chrominance prediction value from a chrominance value of the current image data;
    deriving a quantized luminance value by quantizing the luminance residual;
    deriving an inverse quantized luminance value by inverse quantizing the quantized luminance value;
    selecting one of candidate coefficients as a modification factor;
    calculating a second chrominance residual by subtracting an adjustment value from the first chrominance residual, wherein the adjustment value is equal to the inverse quantized luminance value multiplied by the modification factor;
    deriving a quantized chrominance value by quantizing the second chrominance residual;
    encoding the quantized luminance value and the quantized chrominance value to produce encoded data;
    decoding the encoded data to obtain decoded image data, the decoded image data comprising decoded luminance data and decoded chrominance data; and
    controlling a display device according to the decoded image data to display the image.

2. The method of claim 1, wherein the candidate coefficients are greater than or equal to −1, less than or equal to 1, and equal to $m/2^n$, where n and m represent integers, and wherein the modification factor is determined among the candidate coefficients such that a difference between the first chrominance residual and the adjustment value is minimized.

3. The method of claim 1, comprising:
    dividing the previous image data into previous sub-image data sets that correspond to sub-image of the image;
    dividing the current image data into current sub-image data sets that correspond to the sub-image of the image;
    determining sub-image quantized luminance values and sub-image quantized chrominance values using the previous sub-image data sets and the current sub-image data sets;
    calculating compression difficulty values for the sub-images of the image based on an average quantized value of the previous sub-image data sets;
    calculating compression difficulty ratios using the compression difficulty value and an average of the compression difficulty values; and
    adjusting bit rates for the sub-images of the image based on the compression difficulty ratios.

4. The method of claim 3, wherein the compression difficulty ratios are converted to $m/2^n$, where n and m represent integers.

5. The method of claim 1, wherein the deriving the luminance prediction value includes:
    selecting one of candidate vector values as a first vector value such that a first similarity index between a luminance value corresponding to the first vector value and a luminance value corresponding to a reference position is minimized;
    selecting one of the first vector value and adjacent vector values adjacent to the first vector value as a second vector value such that a second similarity index between a luminance value corresponding to the second vector value and the luminance value corresponding to the reference position is minimized; and
    calculating the luminance prediction value based on the luminance value corresponding to the second vector value.

6. The method of claim 5, wherein intervals between immediately neighboring vector values of the candidate vector values are integers greater than 1.

7. The method of claim 5, wherein intervals between immediately neighboring vector values of the candidate vector values increase as distances between the reference position and the candidate vector values increase.

8. The method of claim 5, wherein at least one of the first similarity index and the second similarity index is calculated using a sum of absolute differences between one or more pixel values of pixels that are included in a pixel group or adjacent to the pixel group and one or more pixel values of pixels located in the reference position.

9. The method of claim 1, wherein the deriving the luminance prediction value includes:
    calculating median values of luminance values of pixels that are adjacent to each other;
    selecting one of candidate vector values corresponding the median values as a first vector value such that a similarity index between a median value of the first vector value and a luminance value corresponding to a reference position is minimized, intervals between immediately neighboring vector values of the candidate vector values are integers greater than 1;
    selecting one of the first vector value and adjacent vector values adjacent to the first vector value as a second vector value such that a similarity index between a luminance value corresponding to the second vector value and the luminance value corresponding to the reference position is minimized; and calculating the luminance prediction value based on the luminance value corresponding to the second vector value.

10. The method of claim 1, wherein a first luminance prediction value and a first chrominance prediction value associated with a first pixel located at a boundary of a pixel group are adjusted based on a second luminance prediction value and a second chrominance prediction value associated with a second pixel adjacent to the first pixel and outside the pixel group.

11. The method of claim 1, wherein the deriving the quantized chrominance value includes:

selecting one of candidate quantization tables as a quantization table based on a difference value between an absolute average of luminance residuals and an absolute average of chrominance residuals;

deriving a chrominance quantization parameter from the quantization table; and quantizing the second chrominance residual based on the chrominance quantization parameter.

12. The method of claim 1, wherein the deriving the quantized luminance value includes:

deriving a luminance quantization parameter from a quantization table;

subtracting an offset value from the luminance quantization parameter to produce an adjusted luminance quantization parameter when a pixel is located at a boundary of a pixel group; and quantizing a first luminance residual for the pixel based on the adjusted luminance quantization parameter.

13. The method of claim 12, wherein the offset value increases as the luminance quantization parameter increases.

14. A method for displaying an image, the method comprising:

deriving a luminance prediction value for a first pixel based on a luminance value of previous image data, wherein the first pixel is located at a boundary of a pixel group;

calculating a luminance residual for the first pixel by subtracting the luminance prediction value from a luminance value of current image data;

deriving a chrominance prediction value for the first pixel based on a chrominance value of the previous image data;

calculating a chrominance residual for the first pixel by subtracting the chrominance prediction value from a chrominance value of the current image data;

deriving a quantization parameter from a quantization table;

subtracting an offset value from the quantization parameter to produce an adjusted quantization parameter;

quantizing the luminance residual and the chrominance residual for the pixel based on the adjusted quantization parameter to derive a quantized luminance value and a quantized chrominance value;

encoding the quantized luminance value and the quantized chrominance value to produce encoded data;

decoding the encoded data to obtain decoded image data; and controlling a display device according to the decoded image data to display the image.

15. The method of claim 14, wherein the offset value increases as the quantization parameter increases.

16. The method of claim 14, wherein the quantization table is determined among a plurality of candidate quantization tables based on a difference value between an absolute average of luminance residuals and an absolute average of chrominance residuals.

17. A method for displaying an image, the method comprising:

selecting one of candidate vector values as a first vector value such that a first similarity index between a pixel value corresponding to the first vector value and a pixel value corresponding to a reference position is minimized, wherein intervals between immediately neighboring vector values of the candidate vector values are integers greater than 1;

selecting one of the first vector value and adjacent vector values adjacent to the first vector value as a second vector value such that a second similarity index between a pixel value corresponding to the second vector value and the pixel value corresponding to the reference position is minimized;

calculating a luminance prediction value and a chrominance prediction value based on the pixel value corresponding to the second vector value;

calculating a luminance residual by subtracting the luminance prediction value from a luminance value of current image data;

calculating a chrominance residual by subtracting the chrominance prediction value from a chrominance value of the current image data;

quantizing the luminance residual and the chrominance residual to derive a quantized luminance value and a quantized chrominance value;

encoding the quantized luminance value and the quantized chrominance value to produce encoded data;

decoding the encoded data to obtain decoded image data; and controlling a display device according to the decoded image data to display the image.

18. The method of claim 17, wherein at least one of the first similarity index and the second similarity index is calculated using a sum of absolute differences between one or more pixel values of pixels that are included in a pixel group or adjacent to the pixel group and one or more pixel values of pixels located in the reference position.

19. The method of claim 17, wherein a first luminance prediction value and a first chrominance prediction value associated with a first pixel located at a boundary of a pixel group are adjusted based on a second luminance prediction value and a second chrominance prediction value associated with a second pixel adjacent to the first pixel and outside the pixel group.

20. A method for displaying an image, the method comprising:

deriving a quantized luminance value and a quantized chrominance value by decoding a bitstream;

deriving an inverse quantized luminance value by inverse quantizing the quantized luminance value;

deriving a luminance prediction value based on a luminance value of previous image data, wherein the previous image data corresponds to a previous frame or a previously processed line of pixels for which an encoding operation is previously performed;

generating a decoded luminance value by adding the inverse quantized luminance value and the luminance prediction value;

deriving an inverse quantized chrominance value by inverse quantizing the quantized chrominance value;

deriving a chrominance prediction value based on a chrominance value of the previous image data;

generating a first decoded chrominance value by adding the inverse quantized chrominance value and the chrominance prediction value;

selecting one of candidate coefficients as a modification factor;

generating a second decoded chrominance value by adding the first decoded chrominance value and an addition value, the addition value being equal to the inverse quantized luminance value multiplied by the modification factor; and controlling a display device according to at least one of the first decoded chrominance value and the second decoded chrominance value to display the image.

* * * * *